(12) United States Patent
Funato et al.

(10) Patent No.: US 7,195,580 B2
(45) Date of Patent: Mar. 27, 2007

(54) VEHICLE CONTROL SYSTEM

(75) Inventors: Masahiro Funato, Hirakata (JP);
Toshikazu Okada, Osaka (JP); Shigeru Yamamoto, Hirakata (JP); Tomohiro Nakagawa, Hirakata (JP)

(73) Assignee: Komatsu Ltd., Tokyo (JP)

( * ) Notice: Subject to any disclaimer, the term of this patent is extended or adjusted under 35 U.S.C. 154(b) by 171 days.

(21) Appl. No.: 10/979,922

(22) Filed: Nov. 1, 2004

(65) Prior Publication Data
US 2005/0101436 A1    May 12, 2005

(30) Foreign Application Priority Data
Nov. 11, 2003  (JP) .............................. 2003-381605
Oct. 8, 2004  (JP) .............................. 2004-296581

(51) Int. Cl.
*B60W 10/04* (2006.01)
(52) U.S. Cl. ...................................... 477/110; 477/115
(58) Field of Classification Search ................ 477/34, 477/107, 110, 115; 701/54, 55
See application file for complete search history.

(56) References Cited

U.S. PATENT DOCUMENTS

| | | | |
|---|---|---|---|
| 4,082,013 A | | 4/1978 | Dornfeld et al. |
| 4,309,917 A | | 1/1982 | Leet |
| 4,497,223 A | | 2/1985 | Maruyama et al. |
| 4,637,275 A | | 1/1987 | Whalen |
| 5,337,629 A | * | 8/1994 | Kita .............................. 477/52 |
| 5,682,315 A | * | 10/1997 | Coutant et al. ................ 701/57 |
| 6,039,666 A | * | 3/2000 | Okuda et al. .................. 475/72 |
| 6,343,250 B1 | * | 1/2002 | Kuras et al. .................. 701/51 |
| 6,424,902 B1 | * | 7/2002 | Kuras .......................... 701/51 |
| 6,937,731 B2 | | 8/2005 | Funato et al. |

FOREIGN PATENT DOCUMENTS

| | | |
|---|---|---|
| DE | 10 2004 046 177 A1 | 5/2005 |
| EP | 0 754 882 A2 | 1/1997 |
| JP | 62-31660 B2 | 7/1987 |
| JP | 7-243504 * | 9/1995 |

OTHER PUBLICATIONS

*Related* U.S. Appl. No. 10/946,516, filed Sep. 21, 2004; Title: Vehicle Control System; Inventors: Masahiro Funato et al.

* cited by examiner

*Primary Examiner*—Ha Ho
(74) *Attorney, Agent, or Firm*—Frishauf, Holtz, Goodman & Chick, P.C.

(57) ABSTRACT

A vehicle control system which is capable of performing a quick decelerating operation in all vehicle speed regions and setting a direct region where power from an engine is transmitted through a mechanical transmission unit only in a hydro-mechanical transmission. The vehicle control system includes an engine and a hydro-mechanical transmission and is designed to set a tractive force-vehicle speed characteristic corresponding to the direct region where power transmission from the input shaft to the intermediate output shaft of the hydro-mechanical transmission is done by the mechanical transmission unit alone in a specified engine speed region. An engine control system controls the engine and a decelerator outputs a deceleration command according to an operating amount thereof. The engine control system controls the engine to reduce engine output torque corresponding to a specified engine speed region in response to the deceleration command.

8 Claims, 15 Drawing Sheets

3 (a)

3 (b)

3 (c)

12 (a)

12 (b)

13 (a)

13 (b)

14 (a)

14 (b)

VEHICLE CONTROL SYSTEM

TECHNICAL FIELD

The present invention relates to a vehicle control system adapted for use in a work vehicle such as a bulldozer.

BACKGROUND ART

There have been known vehicle control systems having an engine and a hydro-mechanical transmission (HMT) which transmits engine power from an input shaft to an output shaft through a mechanical transmission unit and a hydrostatic transmission unit (e.g., Japanese Patent Kokoku Publication No. 62-31660). Since mechanical power can be transmitted with high efficiency, the transmission (HMT) provided for this vehicle control system is designed to convert only part of mechanical power into hydraulic power, so that it can achieve high transmission efficiency. Such a transmission is considered to be an ideal transmission for vehicles subjected to wide load variations such as bulldozers and wheel loaders and is, in fact, employed in some vehicles.

In a typical hydro-mechanical transmission (HMT), variable speed characteristics are achieved by a planetary gear train. More concretely, the transmission is arranged as follows. Of three elements (i.e., the sun gear, the carrier provided with planetary gears, and the ring gear) of the planetary gear train, a first element is coupled to the input shaft, a second element is coupled to the output shaft, and a third element is coupled to a hydraulic pump or hydraulic motor. The rotational speed of the hydraulic pump or hydraulic motor is varied thereby changing the rotational speed of the output shaft.

In the known art, there are basically two types of HMTs. One is the "output-split type" where a hydraulic pump or hydraulic motor, which is connected to another hydraulic pump or hydraulic motor coupled to the planetary gear train by means of a hydraulic circuit, is coupled to the input shaft of the transmission so as to obtain a constant speed ratio. The other is the "input-split type" where a hydraulic pump or hydraulic motor, which is connected to another hydraulic pump or hydraulic motor coupled to the planetary gear train by means of a hydraulic circuit, is coupled to the output shaft of the transmission so as to obtain a constant speed ratio. Further, the output-split type and input-split type are respectively classified into six types according to which of the three elements of the planetary gear train is coupled to the hydraulic pump, hydraulic motor or input/output shafts and, in total, 12 types are available as basic combinations.

The conventional output-split type HMT and input-split type HMT will be respectively described in more detail.

FIG. 12(a) shows a schematic structural diagram of an output-split type HMT. In this output-split type HMT 100, a first gear 103 is secured to an input shaft 102 to which power from an engine 101 is input. A second gear 104 meshing with the first gear 103 is secured to a shaft 105a of a first pump/motor 105. Secured to the input shaft 102 is a sun gear 107 of a planetary gear train 106. A plurality of planetary gears 108 are disposed so as to mesh with the periphery of the sun gear 107. Each planetary gear 108 is axially supported by a planetary carrier 109 to which an output shaft 110 is secured. A ring gear 111 meshes with the periphery of the planetary gear set 108. Meshing with the periphery of the ring gear 111 is a third gear 112 which is, in turn, secured to a shaft 113a of a second pump/motor 113. In this arrangement, the first pump/motor 105 is hydraulically connected to the second pump/motor 113 by a piping 114.

In such a system, when the rotational speed of the second pump/motor 113, that is, the rotational speed of the ring gear 111 is zero, hydraulically transmitted power becomes zero so that all power is transmitted through the mechanical unit. On the basis of the rotational speed of the output shaft 110 at that time, the operation of this system will be described below.

(1) When increasing the rotational speed of the output shaft 110, the second pump/motor 113 receives motive power through the medium of hydraulic pressure and is then activated to increase the rotational speed of the output shaft 110. At that time, the first pump/motor 105 serves as a pump whereas the second pump/motor 113 serves as a motor, so that energy is transmitted from the first pump/motor 105 to the second pump/motor 113 through the medium of hydraulic pressure. Then, the horsepower transmitted in the form of hydraulic power becomes plus (+) as indicated by line A-B in FIG. 12(b) and the hydraulic power flows in a forward direction, i.e., from the input shaft 102 toward the planetary gear train 106.

(2) When reducing the rotational speed of the output shaft 110, the second pump/motor 113 receives motive power from the planetary gear train 106 and rotates in a direction opposite to that of the case (1). At that time, the second pump/motor 113 serves as a pump whereas the first pump/motor 105 serves as a motor, so that energy is transmitted from the second pump/motor 113 to the first pump/motor 105 through the medium of hydraulic pressure. Then, the horsepower transmitted in the form of hydraulic power becomes minus (−) as indicated by line A-C in FIG. 12(b) and the hydraulic power flows in a reverse direction, i.e., from the planetary gear train 106 toward the input shaft 102.

FIG. 13(a) shows an input-split type HMT 200 in which the planetary gear train 106 is disposed on the side of the input shaft 102 whereas the first pump/motor 105 is disposed on the side of the output shaft 110. In FIG. 13(a), the parts that are substantially equivalent or function substantially similarly to those of the transmission 100 shown in FIG. 12(a) are indicated by the same numerals as in FIG. 12(a), and a detailed explanation of them is skipped herein.

The input-split type transmission 200 is constructed as follows.

(1) When increasing the rotational speed of the output shaft 110, the second pump/motor 113 serves as a motor while the first pump/motor 105 serves as a pump, so that energy is transmitted from the first pump/motor 105 to the second pump/motor 113 through the medium of hydraulic pressure. Then, the horsepower transmitted in the form of hydraulic power becomes minus (−) as indicated by line A-D in FIG. 13(b) and the hydraulic power flows in a reverse direction, i.e., from the output shaft 110 toward the planetary gear train 106.

(2) When reducing the rotational speed of the output shaft 110, the second pump/motor 113 receives motive power from the planetary gear train 106 and rotates in a direction opposite to that of the case (1). At that time, the second pump/motor 113 serves as a pump whereas the first pump/motor 105 serves as a motor, so that energy is transmitted from the second pump/motor 113 to the first pump/motor 105 through the medium of hydraulic pressure. Then, the horsepower transmitted in the form of hydraulic power becomes plus (+) as indicated by line A-E in FIG. 13(b) and the hydraulic power flows in a forward direction, i.e., from the planetary gear train 106 toward the output shaft 110.

As such, in both of the output-split type and input-split type transmissions, energy flows in forward and reverse directions occur in the speed increasing area and the speed reducing area. The energy transmission efficiency in this case will be hereinafter examined, taking the output-split type HMT 100 shown in FIG. 12 for example. Herein, the transmission efficiency of the mechanical unit is 95% and the transmission efficiency of the hydrostatic unit is 80% (Generally, where pump-motors are used, transmission efficiency is low). For easy comparison, assume that the amount of engine power is 1.0 and one third the engine power is input to the hydrostatic unit.

FIG. 14(*a*) shows the case where hydraulic power flows in the forward direction. Specifically, one third (0.333 part) the energy output from the engine 101 flows to the hydrostatic unit for increasing speed. Transmitted to the output shaft 110 are 0.633 (=(1−⅓)×0.95) part of energy from the mechanical unit and 0.267 (=0.333×0.8) part of energy from the hydrostatic unit. As a result, the overall efficiency becomes 0.9 (=0.633+0.267). The case where hydraulic power flows in the reverse direction is shown in FIG. 14(*b*). In this case, 1.267 (=1+0.267) parts of energy are input to the mechanical unit and 1.20 (=1.267×0.95) parts of energy are transmitted, so that the overall efficiency is 0.870 (=1.20−0.333).

As just described, when hydraulic power flows in the reverse direction, a large flow of energy occurs in each element, resulting in poor efficiency. In other words, a forward flow of hydraulic energy is better than a reverse flow of hydraulic energy. As seen from FIGS. 14(*a*) and 14(*b*), if part of energy flows in the reverse direction, the amount of energy that passes through the mechanical unit will increase, and therefore, there arises a need to increase the size of the planetary gear train, which leads to a disadvantage in economical efficiency.

As an attempt to solve the problems of the prior art output-split type HMT and input-split type HMT, there has been proposed a transmission capable of serving as an output-split type HMT when the rotational speed of the output shaft is increased and as an input-split type HMT when the rotational speed of the output shaft is reduced (Hereinafter, this proposed transmission is referred to as "output-split/input-split switching type HMT"). The output-split/input-split switching type HMT has several advantages. For instance, the horsepower transmitted in the form of hydraulic power can be kept to be plus irrespective of the rotational speed of the output shaft, so that hydraulic power can be allowed to constantly flow in the forward direction and increased energy efficiency can be achieved in all speed regions ranging from the low speed region to the high speed region.

A vehicle control system having an engine and the output-split/input-split switching type HMT described above is constructed as follows. Gear shifting is carried out such that, as shown in FIG. 15, an engine output torque value $T_Q$ corresponding to an engine speed $N_Q$ in a lower speed region is set as an input torque value and the output-split/input-split switching type HMT generates, from its output shaft, output torque which matches tractive force required by a load, while keeping the input torque value constant. Then, a tractive force-vehicle speed characteristic line (represented by chain line $WL_Q$ in FIG. 15) in the lower speed region is set based on the gear shifting operation described above. Also, gear shifting is carried out such that, an engine output torque value $T_H$ corresponding to an engine speed $N_H$ in a higher speed region is set as an input torque value and the output-split/input-split switching type HMT generates, from its output shaft, output torque which matches tractive force required by a load, while keeping the input torque value constant. Then, a tractive force-vehicle speed characteristic line (represented by chain line $WL_H$ in FIG. 15) in the higher speed region is set based on the gear shifting operation described above. Further, a direct region, which is an engine speed region between the engine speed $N_Q$ in the lower speed region and the engine speed $N_H$ in the higher speed region and in which power transmission from the input shaft to the output shaft is carried out by the mechanical transmission unit alone in the output-split/input-split switching type HMT, is established in a frequently used area in the characteristic graph showing the relationship between tractive force and vehicle speed, and a tractive force-vehicle speed characteristic line (represented by solid line $WL_G$ in FIG. 15) corresponding to the direct region is set.

In addition, the tractive force-vehicle speed characteristic line $WL_Q$ in the lower speed region is designed to be used for an input-split type HMT, whereas the tractive force-vehicle speed characteristic line $WL_H$ in the higher speed region is designed to be used for an output-split type HMT. "The all-speed control" for controlling engine speed in all speed regions as indicated by regulation lines $RL_0$ to $RL_6$ in FIG. 15 is employed for engine control, because in the all-speed control, engine speed fluctuations due to variations in the load are less likely to occur and, therefore, high stability can be ensured. It should be noted that, in FIG. 15, the engine speed $N_Q$ in the lower speed region is an engine speed corresponding to the maximum torque point of the engine, whereas the engine speed $N_H$ in the higher speed region is an engine speed corresponding to the rated torque point (i.e., the output torque point at which the output of the engine becomes a rated output) of the engine. The point, which is specified by the engine speed $N_Q$ in the lower speed region associated with the setting of the tractive force-vehicle speed characteristic line $WL_Q$ in the lower speed region and by the engine output torque value $T_Q$ corresponding to the engine speed $N_Q$ in the lower speed region, is hereinafter referred to as "a matching point $M_Q$ in the lower speed region". The point, which is specified by the engine speed $N_H$ in the higher speed region associated with the setting of the tractive force-vehicle speed characteristic line $WL_H$ in the higher speed region and by the engine output torque value $T_H$ corresponding to the engine speed $N_H$ in a higher speed region, is hereinafter referred to as "a matching point $M_H$ in the higher speed region".

The vehicle control system having the output-split/input-split switching type HMT, however, suffers from the following problem, owing to the facts that the matching point $M_Q$ in the lower speed region and the matching point $M_H$ in the higher speed region need to be spaced at a certain distance in order to effectively form the direct region and that the all-speed control is employed for engine control. Specifically, where a balancing point Q between a tractive force $F_Q$ required by a load and a vehicle speed $V_Q$ lies on the tractive force-vehicle speed characteristic line $WL_Q$, the engine conforms to the output-split/input-split switching type HMT at the matching point $M_Q$ in the lower speed region, even if the opening of the engine throttle is reduced in conjunction with decelerating operation of the decelerator or the like such that the present regulation line is shifted from the regulation line $RL_0$ for full throttling to the regulation line $RL_4$ which passes through the matching point $M_Q$ in the lower speed region, by way of the regulation lines $RL_1$, $RL_2$ and $RL_3$. Therefore, the output speed of the output-split/input-split switching type HMT cannot be changed by the shifting of the regulation line. In short, this vehicle control system has the problem that there exists a vehicle speed region where vehicle speed cannot rapidly decrease even when the opening of the engine throttle is reduced in conjunction with deceleration.

The invention is directed to overcoming this problem and a primary object of the invention is therefore to provide a vehicle control system capable of rapidly carrying out deceleration in all vehicle speed regions and setting a direct region where power from the engine is transmitted through the mechanical transmission unit alone in the hydro-mechanical transmission.

SUMMARY OF THE INVENTION

The above object can be accomplished by a vehicle control system according to the invention, comprising: an engine and a hydro-mechanical transmission constructed such that power from the engine is transmitted from an input shaft to an output shaft through a mechanical transmission unit and a hydrostatic transmission unit, wherein gear shifting is carried out such that the hydro-mechanical transmission generates, from its output shaft, output torque which matches tractive force required by a load, while setting an engine output torque value corresponding to an engine speed in a lower speed region of the engine as an input torque value and keeping the input torque value constant, and a tractive force-vehicle speed characteristic in the lower speed region is set based on the gear shifting, wherein gear shifting is carried out such that the hydro-mechanical transmission generates, from its output shaft, output torque which matches tractive force required by a load, while setting an engine output torque value corresponding to an engine speed in a higher speed region of the engine as an input torque value and keeping the input torque value constant, and a tractive force-vehicle speed characteristic in the higher speed region is set based on the gear shifting, and wherein a tractive force-vehicle speed characteristic corresponding to a direct region is set, which direct region is an engine speed region between the engine speed in the lower speed region and the engine speed in the higher speed region, in which power from the input shaft to the output shaft is transmitted through the mechanical transmission unit only, the vehicle control system, further, having (a) engine controlling means for controlling the engine and (b) decelerating means for outputting a deceleration command according to its operating amount; and the engine controlling means being formed to control the engine so as to reduce, in response to the deceleration command from the decelerating means, engine output torque which corresponds to an engine speed region including the engine speed in the lower speed region and the engine speed in the higher speed region.

In the invention, as shown in FIG. 9, gear shifting is carried out such that the hydro-mechanical transmission generates, from its output shaft, output torque which matches tractive force required by a load, while setting an engine output torque value $T_Q$ corresponding to an engine speed $N_Q$ in a lower speed region of the engine as an input torque value and keeping this input torque value constant, and a tractive force-vehicle speed characteristic line $WL_Q$ in the lower speed region is set based on the gear shifting. Also, gear shifting is carried out such that the hydro-mechanical transmission generates, from its output shaft, output torque which matches tractive force required by a load, while setting an engine output torque value $T_H$ corresponding to an engine speed $N_H$ in a higher speed region of the engine as an input torque value and keeping this input torque value constant, and a tractive force-vehicle speed characteristic line $WL_H$ in the higher speed region is set based on the gear shifting. In addition, a direct region is formed, which is an engine speed region between the engine speed $N_Q$ in the lower speed region and the engine speed $N_H$ in the higher speed region, in which power transmission from the input shaft to the output shaft is done by the mechanical transmission unit only in the hydro-mechanical transmission. Then, a tractive force-vehicle speed characteristic line $WL_G$ corresponding to the direct region is set.

The invention is provided with engine controlling means for controlling the engine and decelerating means for outputting a deceleration command according to its operating amount. In response to a deceleration command from the decelerating means, the engine controlling means reduces engine output torque which corresponds to an engine speed region including the engine speed $N_Q$ in the lower speed region and the engine speed $N_H$ in the higher speed region (see the engine output torque line indicated by broken line in FIG. 9). Accordingly, the tractive force-vehicle speed characteristic line $WL_Q$ in the lower speed region, the tractive force-vehicle speed characteristic line $WL_G$ corresponding to the direct region, and the tractive force-vehicle speed characteristic line $WL_H$ in the higher speed region are respectively shifted to a lower tractive force region in the tractive force-vehicle speed characteristic graph of FIG. 9 [$(WL_Q; WL_G; WL_H) \rightarrow (WL_Q'; WL_G'; WL_H')$], and vehicle speed determined through determination of a tractive force ($F_Q$; $F_G$; $F_H$) required by a load is rapidly reduced in all vehicle speed regions [$(V_Q \rightarrow V_Q'); (V_G \rightarrow V_G'); (V_H \rightarrow V_H')$]. According to the invention, deceleration can be quickly done in all vehicle speed regions and a direct region can be set where power from the engine is transmitted through the mechanical transmission unit alone in the hydro-mechanical transmission.

DETAILED DESCRIPTION OF THE INVENTION

Referring now to the accompanying drawings, a vehicle control system will be concretely described according to a preferred embodiment of the invention.

Figure 1:
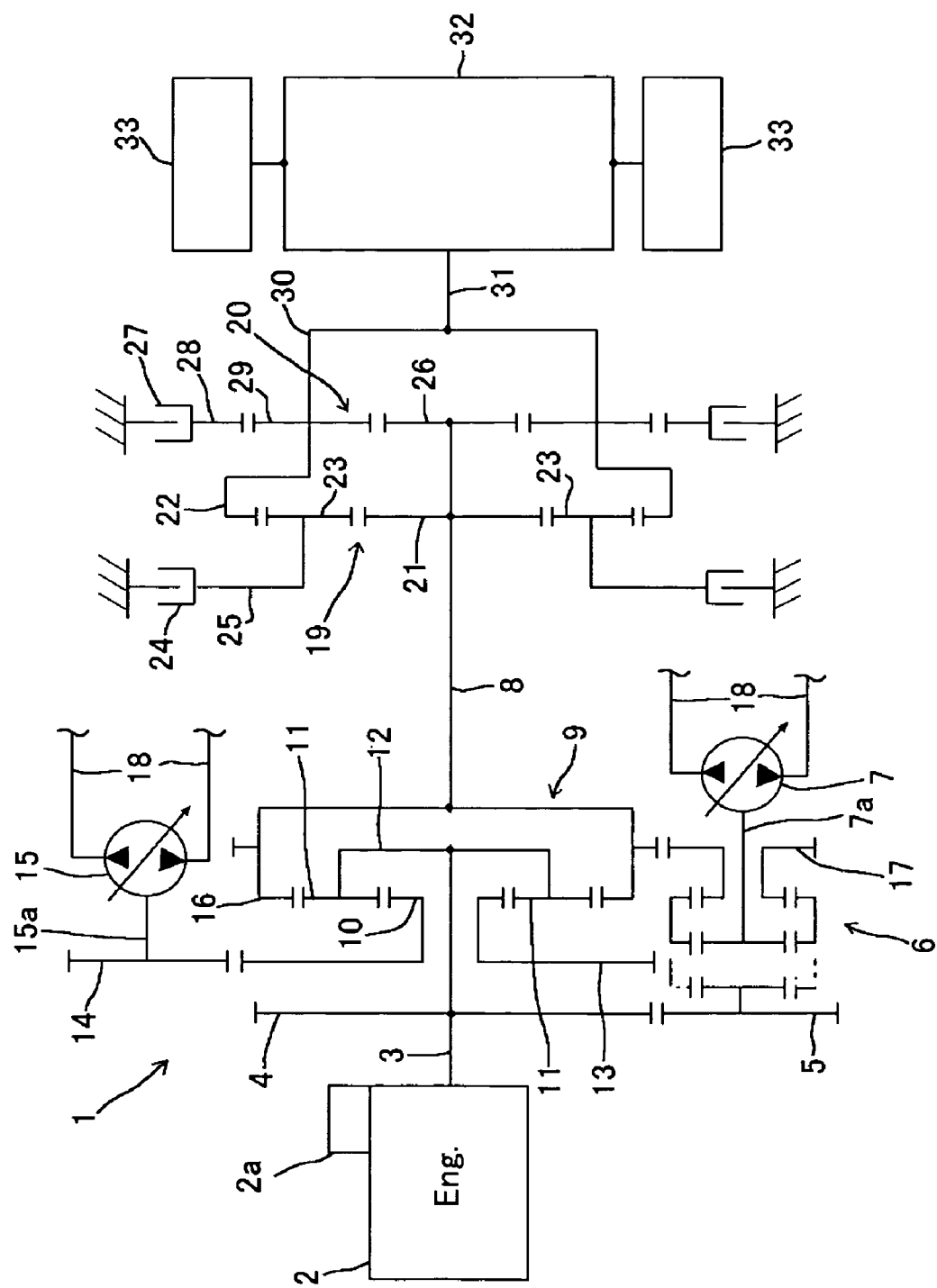
FIG. 1 is a schematic structural diagram of a vehicle control system according to an embodiment of the invention.

FIG. 1 is a schematic structural diagram of a vehicle control system constructed according to an embodiment of the invention. While this embodiment is associated with a case where the invention is applied to the driving system of a track type vehicle such as a bulldozer, it is apparent that the invention is not limited to this.

The vehicle control system of this embodiment has a diesel engine 2 and a hydro-mechanical transmission 1 (hereinafter referred to as "transmission 1") designed to transmit the power of the engine 2 from its input shaft to its output shaft through a mechanical transmission unit and a hydrostatic transmission unit.

Mounted on the engine 2 is an accumulator (common rail) type fuel injection system 2a. This fuel injection system 2a itself is well known in the art and therefore is not illustrated in detail in the drawings. Briefly, the fuel injection system 2a is designed to force fuel into an accumulator by a fuel transfer pump and inject fuel from an injector by opening/closing of a solenoid-controlled valve. Fuel injection characteristics are determined by a drive signal sent from a controller 40 (described later) to the solenoid-controlled valve so that desired injection characteristics can be obtained for all speeds of the engine 2 ranging from the low speed range to the high speed range. In this embodiment, a so-called electronically-controlled injection system composed of the fuel injection system 2a, the controller 40 and various sensors (typically including an engine speed sensor 50 described later) constitutes an engine control system 65 (corresponding to the engine controlling means of the invention). In such an electronically-controlled injection system, a target injection characteristic is mapped by digital values thereby obtaining the engine characteristics described later.

In the transmission 1, a first gear 4 is secured to an input shaft 3 to which power from the engine 2 is input. The first gear 4 meshes with a second gear 5 which can be coupled to a shaft 7a of a first pump/motor 7 through a synchromesh mechanism 6 (which corresponds to "the clutch mechanism" of the invention) 6. The synchromesh mechanism 6 is disposed between the second gear 5 and a fifth gear 17 (described later), for selectively synchronizing the rotation of the shaft 7a with the rotation of the second gear 5 or the rotation of the fifth gear 17 at the time of switching operation.

Disposed between the input shaft 3 and an intermediate output shaft 8 which are aligned on the same axis line is a planetary gear train 9 for gear shifting. On the input shaft 3, a sun gear 10 of the gear-shifting planetary gear train 9 is rotatably supported and a planetary carrier 12 for axially supporting a plurality of planetary gears 11 is secured. A third gear 13 having large diameter is integrally coupled to the sun gear 10. A fourth gear 14 meshes with the periphery of the third gear 13 and is secured to a shaft 15a of a second pump/motor 15. A ring gear 16 meshes with the periphery of the planetary gear set 11. Secured to the ring gear 16 is the intermediate output shaft 8. The fifth gear 17 meshes with the periphery of the ring gear 16, being rotatably and axially supported by the shaft 7a of the first pump/motor 7. The first pump/motor 7 and the second pump/motor 15 are connected to each other through a hydraulic piping 18.

The intermediate output shaft 8 is provided with a single planetary type reverse planetary gear train 19 and forward planetary gear train 20. The reverse planetary gear train 19 is composed of a sun gear 21 secured to the intermediate output shaft 8; a ring gear 22 located outside the sun gear 21; a planetary gear 23 located between the gears 21, 22 so as to mesh therewith; and a planetary carrier 25 for the planetary gear 23, which carrier 25 can be hydraulically braked by a reverse hydraulic clutch 24. The forward planetary gear train 20 is composed of a sun gear 26 secured to the intermediate output shaft 8; a ring gear 28 that is located outside the sun gear 26 and can be hydraulically braked by a forward hydraulic clutch 27; a planetary gear 29 located between the gears 26, 28 so as to mesh therewith; and a planetary carrier 30 for the planetary gear 29, which carrier 30 is integrally secured to the ring gear 22 of the reverse planetary gear train 19.

The planetary carrier 30 is coupled to an output shaft 31 which is in turn coupled to a hydraulically-steering type steering unit 32 disposed on a transverse shaft, through a bevel gear. The steering unit 32 is coupled to right and left final reduction gears 33. Power transmitted from the output shaft 31 to the transverse shaft is then transmitted to right and left sprockets for driving right and left crawler belts respectively through the steering unit 32, the final reduction gears 33 and others.

Figure 12:
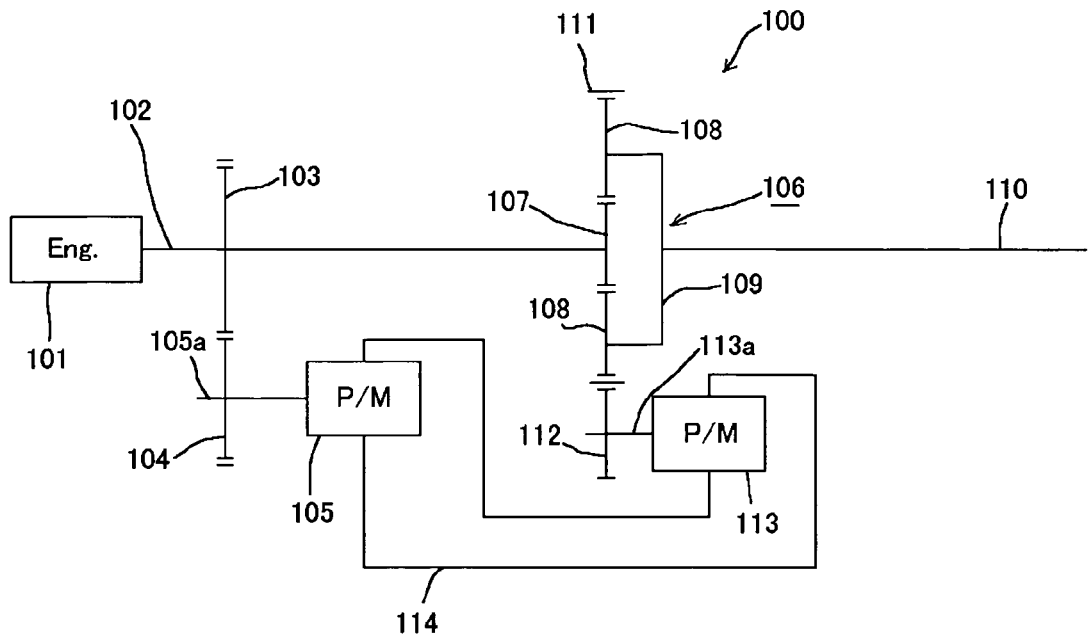
FIGS. 12(a) and 12(b) are a schematic structural diagram and transmitted horsepower characteristic diagram, respectively, of an output-split type HMT having two pump/motors.
Figure 12:
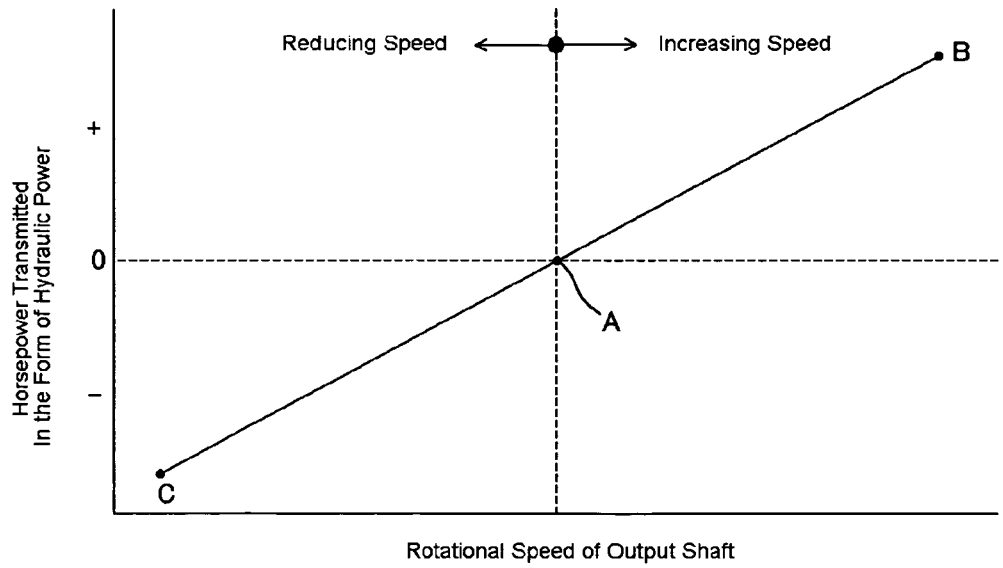
Figure 13:
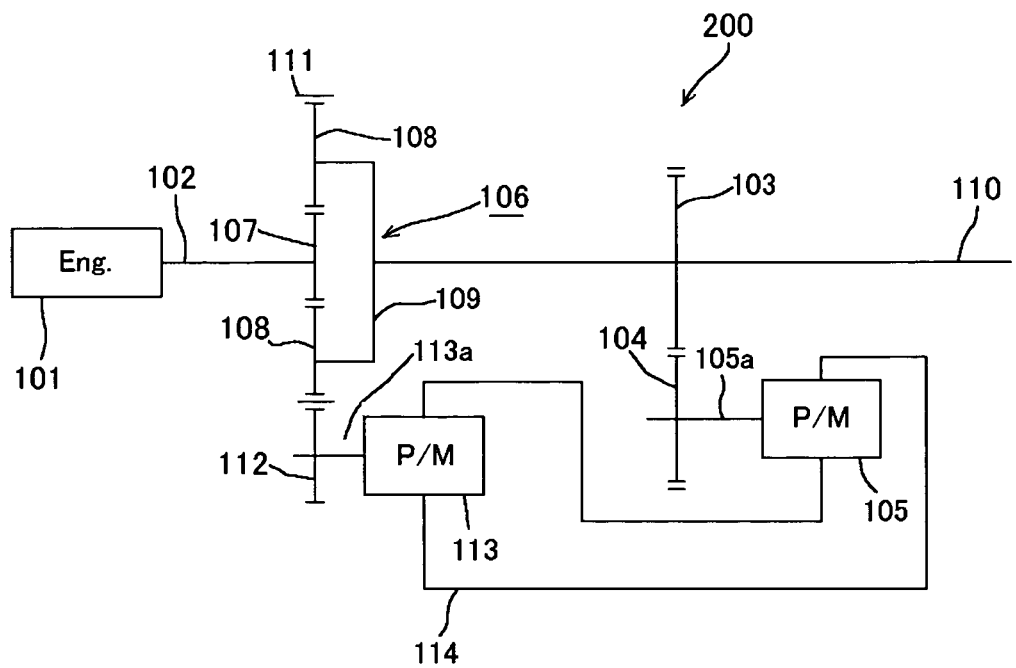
FIGS. 13(a) and 13(b) are a schematic structural diagram and transmitted horsepower characteristic diagram, respectively, of an input-split type HMT having two pump/motors.
Figure 13:
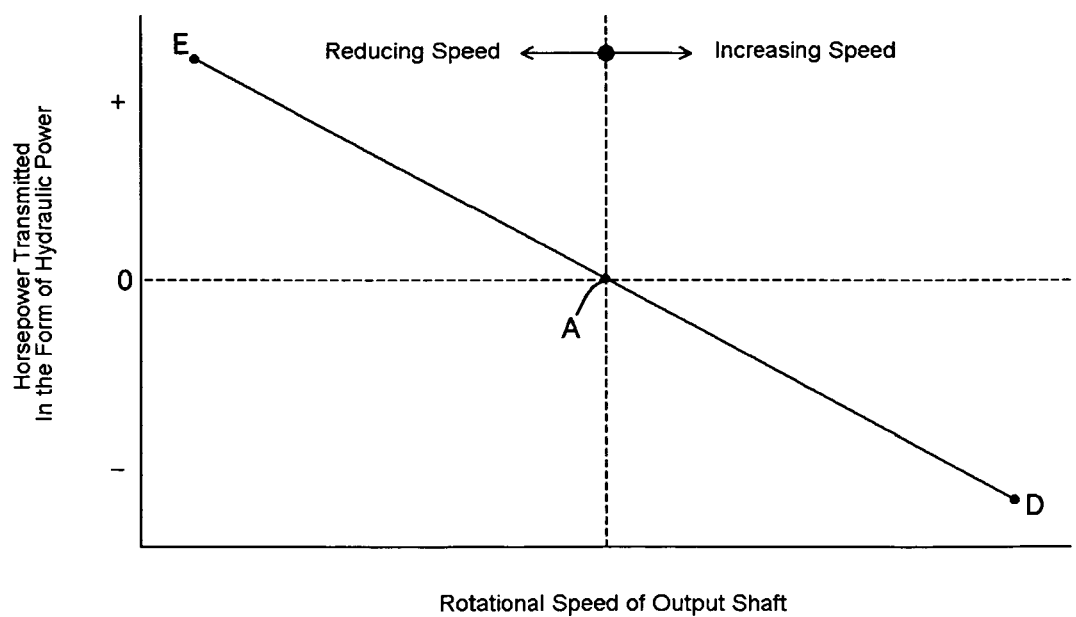
Figure 14:
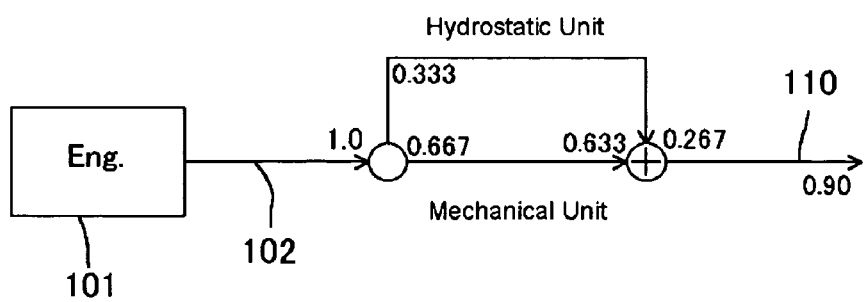
FIGS. 14(a) and 14(b) are explanatory diagrams illustrating the difference in efficiency between energy flows.
Figure 14:
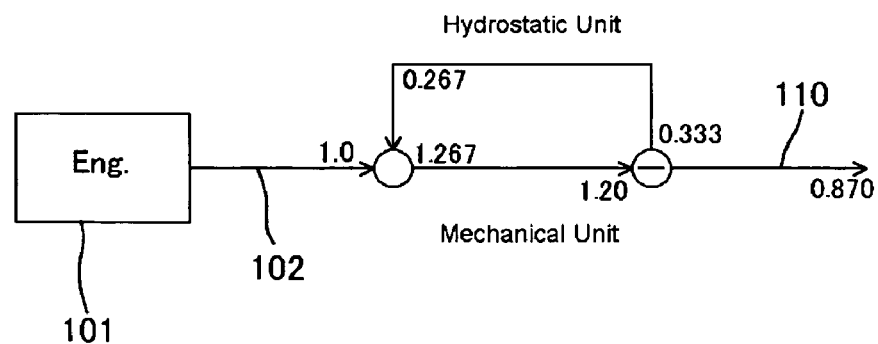
Figure 15:
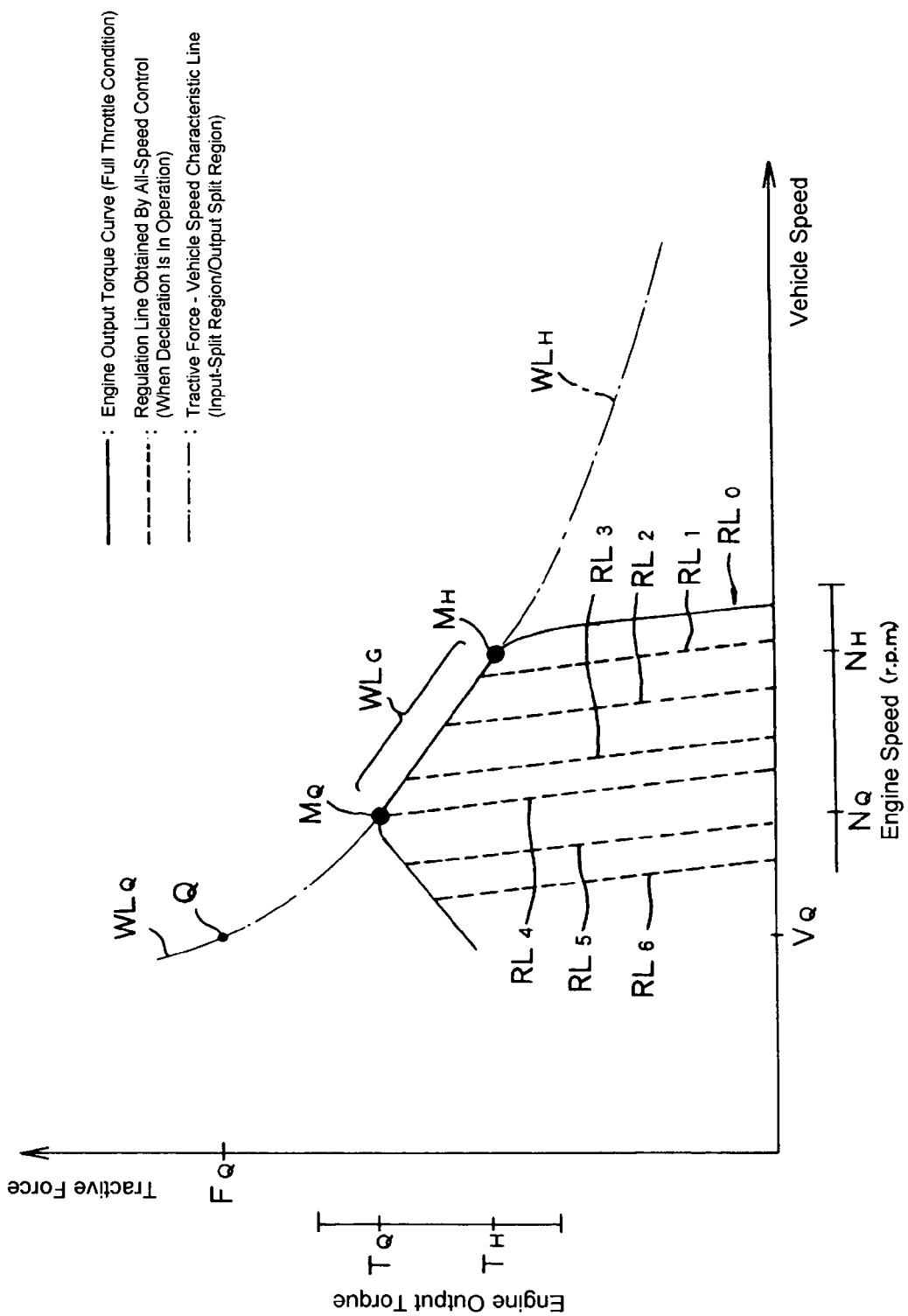
FIG. 15 shows the relationship between a tractive force-vehicle speed characteristic and all speed control in an output-split/input-split switching type HMT.

In the transmission 1 of this embodiment, where the shaft 7a of the first pump/motor 7 is coupled to the second gear 5 by the synchromesh mechanism 6, the first pump/motor 7 is positioned on the input shaft 3 side, so that the transmission 1 serves as an output-split type HMT (see FIG. 12). Where the shaft 7a of the first pump/motor 7 is coupled to the fifth gear 17, the first pump/motor 7 is positioned on the intermediate output shaft 8 side, so that the transmission 1 serves as an input-split type HMT (see FIG. 13).

Specifically, if the shaft 7a of the first pump/motor 7 is coupled to the second gear 5 side when the rotational speed of the intermediate output shaft 8 is on the speed increasing side, the first pump/motor 7 serves as a pump whereas the second pump/motor 15 serves as a motor. Therefore, energy flows, through the medium of hydraulic pressure, from the first pump/motor 7 to the second pump/motor 15. In other words, hydraulic power flows, in a forward direction, from the input shaft 3 to the intermediate output shaft 8. Accordingly, power from the engine 2 is input to the planetary carrier 12 and power from the second pump/motor 15 functioning as a motor is input to the sun gear 10, while rotary power is output from the planetary carrier 12 to the input shaft (shaft 7a) of the first pump/motor 7 functioning as a pump and rotary power is output from the ring gear 16 to the intermediate output shaft 8.

On the other hand, if the shaft 7a of the first pump/motor 7 is coupled to the fifth gear 17 side when the rotational speed of the intermediate output shaft 8 is on the speed decreasing side, the first pump/motor 7 serves as a motor whereas the second pump/motor 15 serves as a pump.

Therefore, energy flows, through the medium of hydraulic pressure, from the second pump/motor 15 to the first pump/motor 7. In other words, hydraulic power flows, in a forward direction, from the input shaft 3 to the intermediate output shaft 8. Accordingly, power from the engine 2 is input to the planetary carrier 12 and power from the first pump/motor 7 functioning as a motor is input to the ring gear 16, while rotary power is output from the sun gear 10 to the input shaft (shaft 15a) of the second pump/motor 15 functioning as a pump and rotary power is output from the ring gear 16 to the intermediate output shaft 8.

Figure 2:
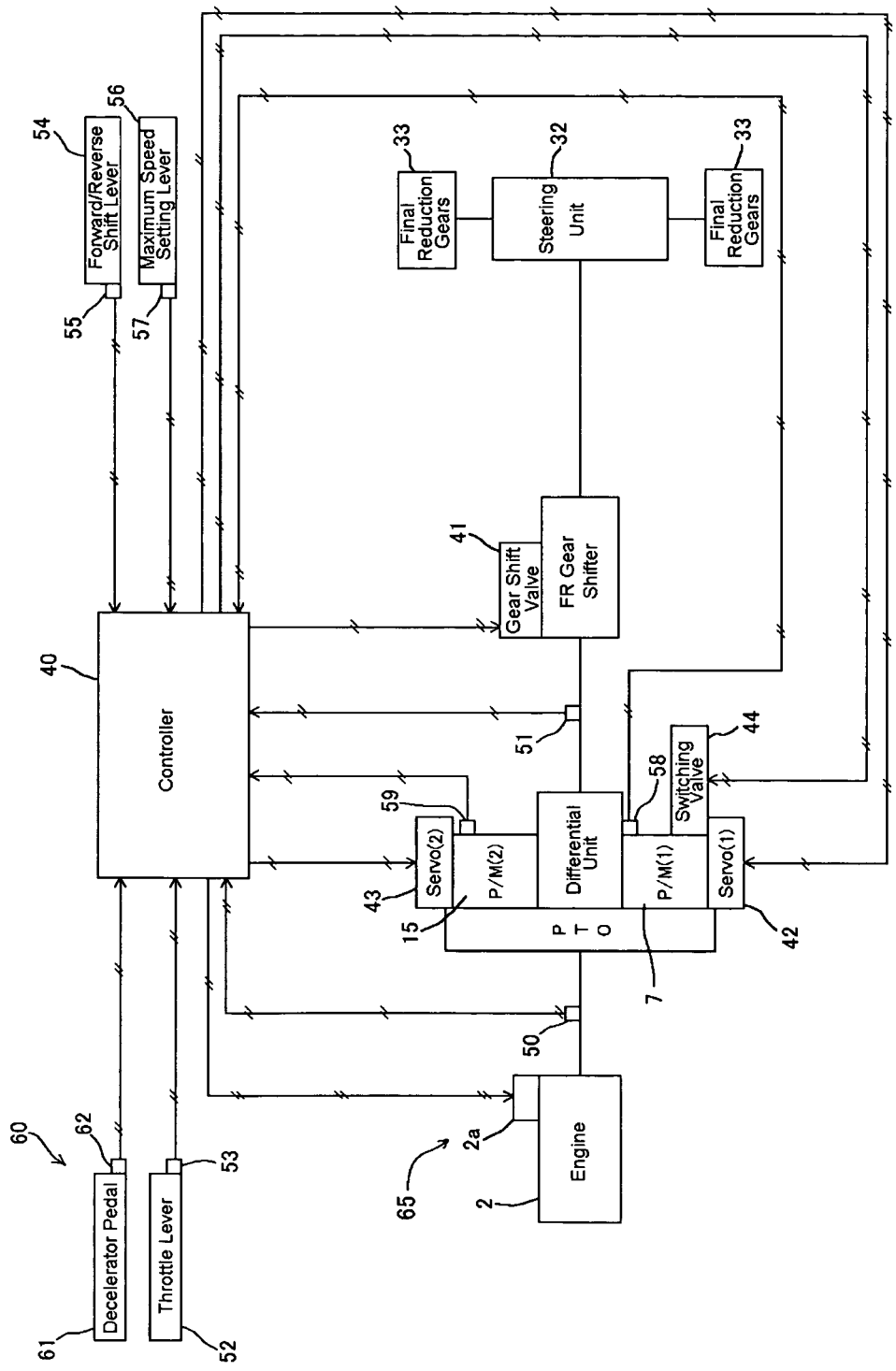
FIG. 2 is a control block diagram of the vehicle control system of the embodiment.

Now, reference is made to the control block diagram of FIG. 2 for explaining the fundamental principle of the control unit of the vehicle control system according to the embodiment.

In the control block diagram shown in FIG. 2, the output shaft of the engine 2 is provided with an engine speed sensor 50 for detecting the actual rotational speed of the output shaft of the engine 2, and the output shaft (i.e., intermediate output shaft 8) of the differential unit (i.e., planetary gear train 9) is provided with a transmission output shaft speed sensor 51 for detecting the actual rotational speed of the output shaft of the differential unit. A throttle lever 52 for setting a throttling amount of the engine 2 is provided with a throttle lever position sensor 53 for detecting the lever position of the throttle lever 52. A forward/reverse shift lever 54 for shifting between forward and reverse is provided with a forward/reverse shift lever position sensor 55 for detecting which of forward (F), neutral (N) and reverse (R) the forward/reverse shift lever 54 is placed in. A maximum speed setting lever 56 (which corresponds to "the maximum speed setting means" of the invention) for setting a maximum speed for the vehicle is provided with a maximum speed setting lever position sensor 57 for detecting the lever position of the maximum speed setting lever 56. The shaft 7a of the first pump/motor 7 is provided with a first pump/motor speed sensor 58 for detecting the actual rotational speed of the shaft 7a, whereas the shaft 15a of the second pump/motor 15 is provided with a second pump/motor speed sensor 59 for detecting the actual rotational speed of the shaft 15a. A decelerator 60 (which corresponds to "the decelerating means" of the invention) for decelerating the vehicle is provided with a decelerator pedal operating amount sensor 62 for detecting the operating amount of a decelerator pedal 61 operated by foot. Input to the controller 40 are (a) an engine speed signal from the engine speed sensor 50; (b) a transmission output shaft speed signal from the transmission output shaft speed sensor 51; (c) a throttle lever position signal (throttle signal) from the throttle lever position sensor 53; (d) a forward/reverse shift lever position signal (forward/reverse shifting signal) from the forward/reverse shift lever position sensor 55; (e) a maximum speed setting lever position signal (maximum speed setting signal) from the maximum speed setting lever position sensor 57; (f) a first pump/motor speed signal from the first pump/motor speed sensor 58; (g) a second pump/motor speed signal from the second pump/motor speed sensor 59; and (h) a decelerator pedal operating amount signal (deceleration signal) from the decelerator pedal operating amount sensor 62.

The controller 40 is composed of a central processing unit (CPU) for executing a specified program; a read only memory (ROM) for storing this program and various tables and maps; and a writable memory serving as a working memory necessary for execution of the program. In response to the engine speed signal, transmission output shaft speed signal, throttle lever position signal (throttle signal), forward/reverse shift lever position signal (forward/reverse shifting signal), maximum speed setting lever position signal (maximum speed setting signal), first pump/motor speed signal and second pump/motor speed signal, the controller 40 performs arithmetic operations through execution of the program. Then, the controller 40 sends a shift control signal to a gear shift valve 41, for shifting between the forward and reverse hydraulic clutches 27, 24. The controller 40 also sends an angle control signal to a servo mechanism 42 for controlling the swash plate angle of the first variable displacement type pump/motor 7 and to a servo mechanism 43 for controlling the swash plate angle of the second variable displacement type pump/motor 15. Further, the controller 40 sends a switch-over signal to a switching valve 44 for moving the sleeve (not shown) of the synchromesh mechanism 6.

Figure 3:
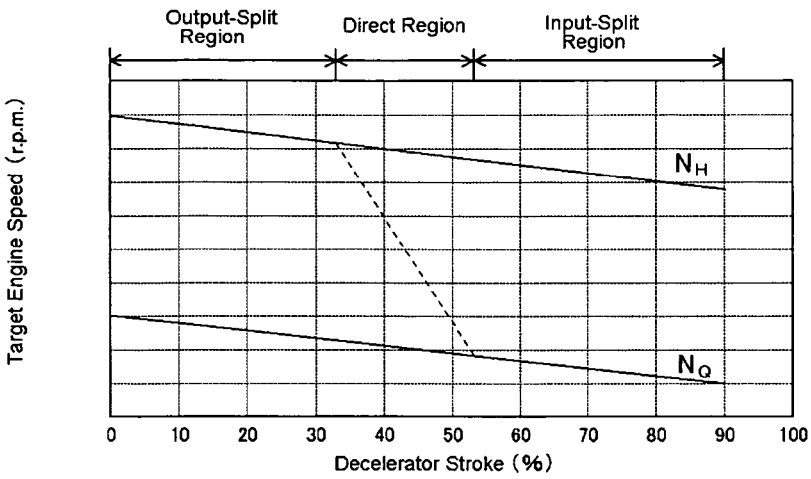
FIG. 3(*a*) to 3(*c*) are target engine speed control maps according to the embodiment.
Figure 3:
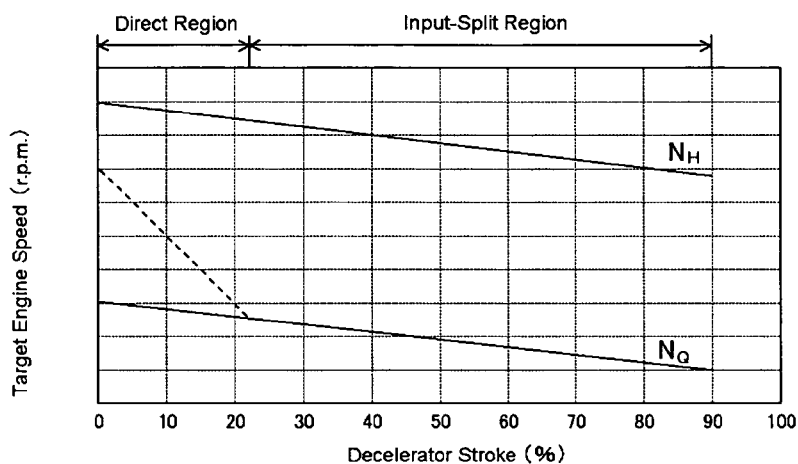
Figure 3:
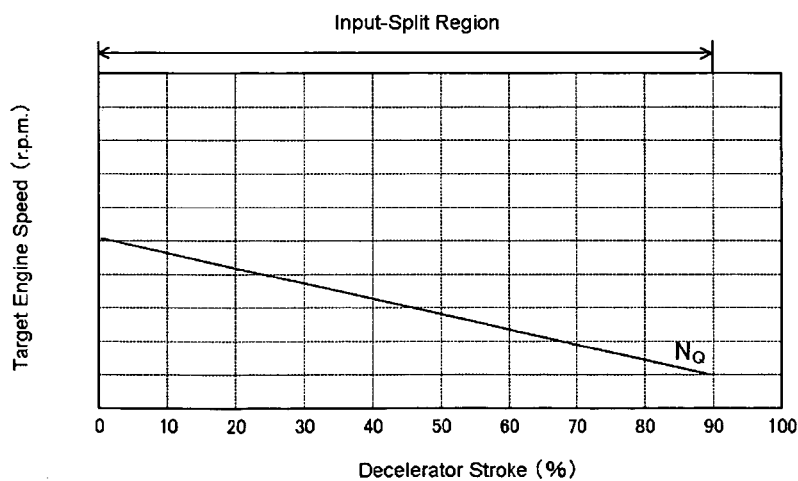

In the controller 40, the ROM stores target engine speed control maps (see FIGS. 3(a) to 3(c)) showing the relationship between target engine speed (a target for the actual speed of the engine 2) and decelerator stroke (the operating amount of the decelerator pedal 61). By looking up the target engine speed control maps with an input signal sent from the decelerator pedal operating amount sensor 62, a target engine speed corresponding to a decelerator stroke can be set. It should be noted that, in the following description, the target engine speed control map shown in FIG. 3(a) is referred to as "target engine speed control map (A)"; the target engine speed control map shown in FIG. 3(b) is as "target engine speed control map (B)"; and the target engine speed control map shown in FIG. 3(c) is as "target engine speed control map (C)".

By use of the following equation (1), the CPU of the controller 40 calculates a target value (target speed ratio) for the speed ratio of the transmission 1 (i.e., the ratio of the rotational speed of the intermediate output shaft 8 to the rotational speed of the input shaft (engine speed)), which target value allows the actual speed of the engine 2 to coincide with the target engine speed.

$$E = e + k(n - N) \tag{1}$$

where E is a target speed ratio, e is an actual speed ratio, k is a constant, n is an actual engine speed and N is a target engine speed.

An angle control signal for making the actual speed ratio e coincident with the target speed ratio E is sent from the controller 40 to the servo mechanisms 42, 43.

If the target engine speed is changed from a first value to a second value lower than the first value through operation of the decelerator 60, the controller 40 outputs a drive signal to the fuel injection system 2a, for reducing the output torque of the engine while maintaining the ratio constant or substantially constant, the ratio being the ratio of the amount of change in the output torque of the engine to the amount of change in the target engine speed. In response to a deceleration signal (deceleration command) sent from the decelerator 60, the controller 40 outputs a drive signal to the fuel injection system 2a to reduce engine output torque which corresponds to an engine speed region including an engine speed $N_Q$ (described later) in a lower speed region and an engine speed $N_H$ (described later) in a higher speed region. When a maximum speed set by the maximum speed setting lever 56 is within the range of a vehicle speed region corresponding to a direct region described later, the controller 40 outputs a drive signal to the fuel injection system 2a to control the speed of the engine so as to match the set maximum speed. In addition, when the maximum speed set by the maximum speed setting lever 56 is within the range of the vehicle speed region corresponding to a tractive force-vehicle speed characteristic $WL_Q$ (described later) in the lower speed region and a tractive force-vehicle speed characteristic $WL_H$ (described later) in the higher speed region, the controller 40 outputs an angle control signal to the servo systems 42, 43 to match the speed ratio and the set maximum speed.

Next, the switch-over control of the switching valve 44, the process performed by the controller 40 during vehicle deceleration, and the fundamental principle of the tractive force-vehicle speed characteristic control will be described in due order, with reference to FIG. 4, the flow chart of FIG. 5 and FIGS. 6 to 9 respectively.

[Switch-Over Control of the Switching Valve 44 (see FIG. 4)]

Figure 4:
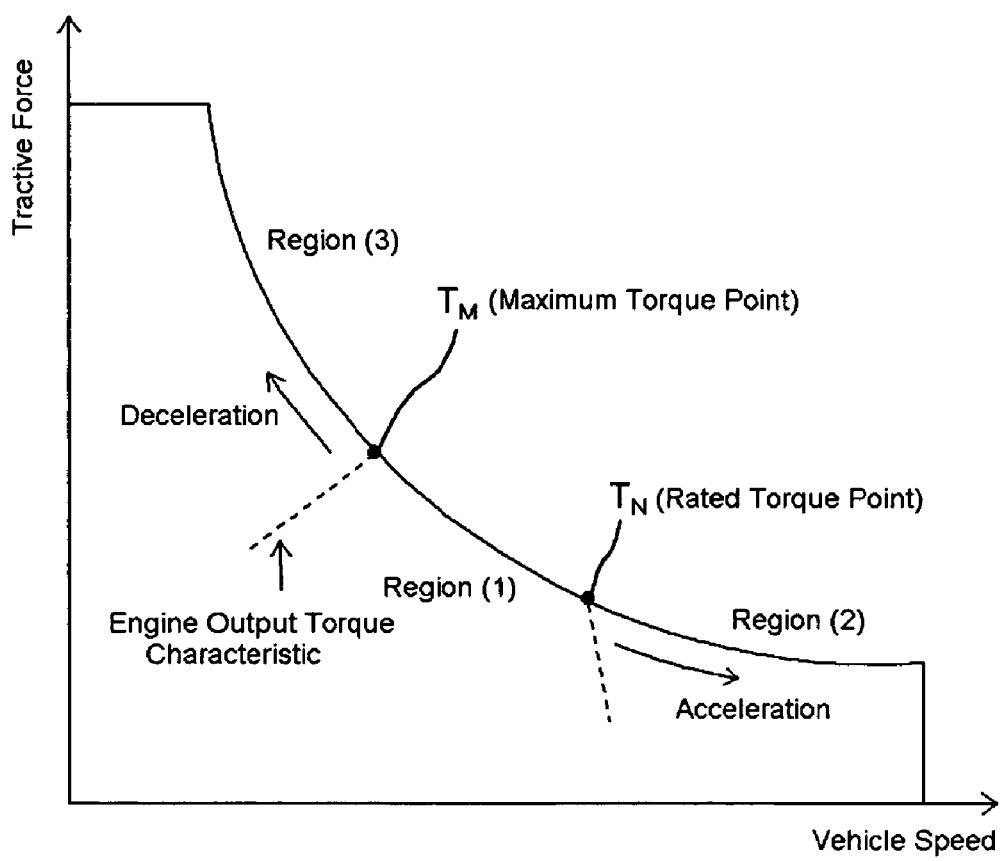
FIG. 4 is a vehicle tractive force-vehicle speed characteristic graph.
Figure 5:
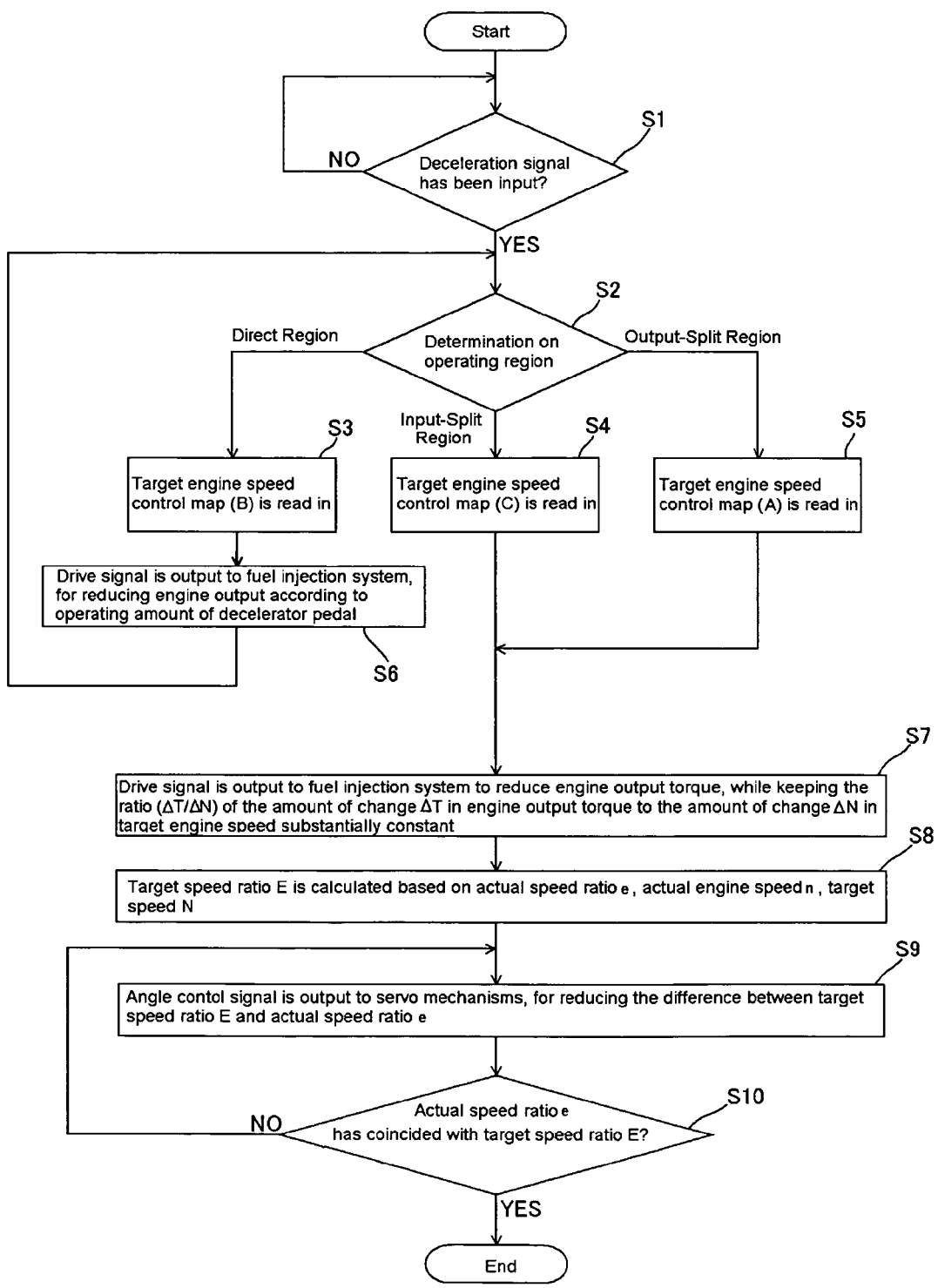
FIG. 5 is a flow chart of a process performed by a controller during vehicle deceleration.
Figure 6:
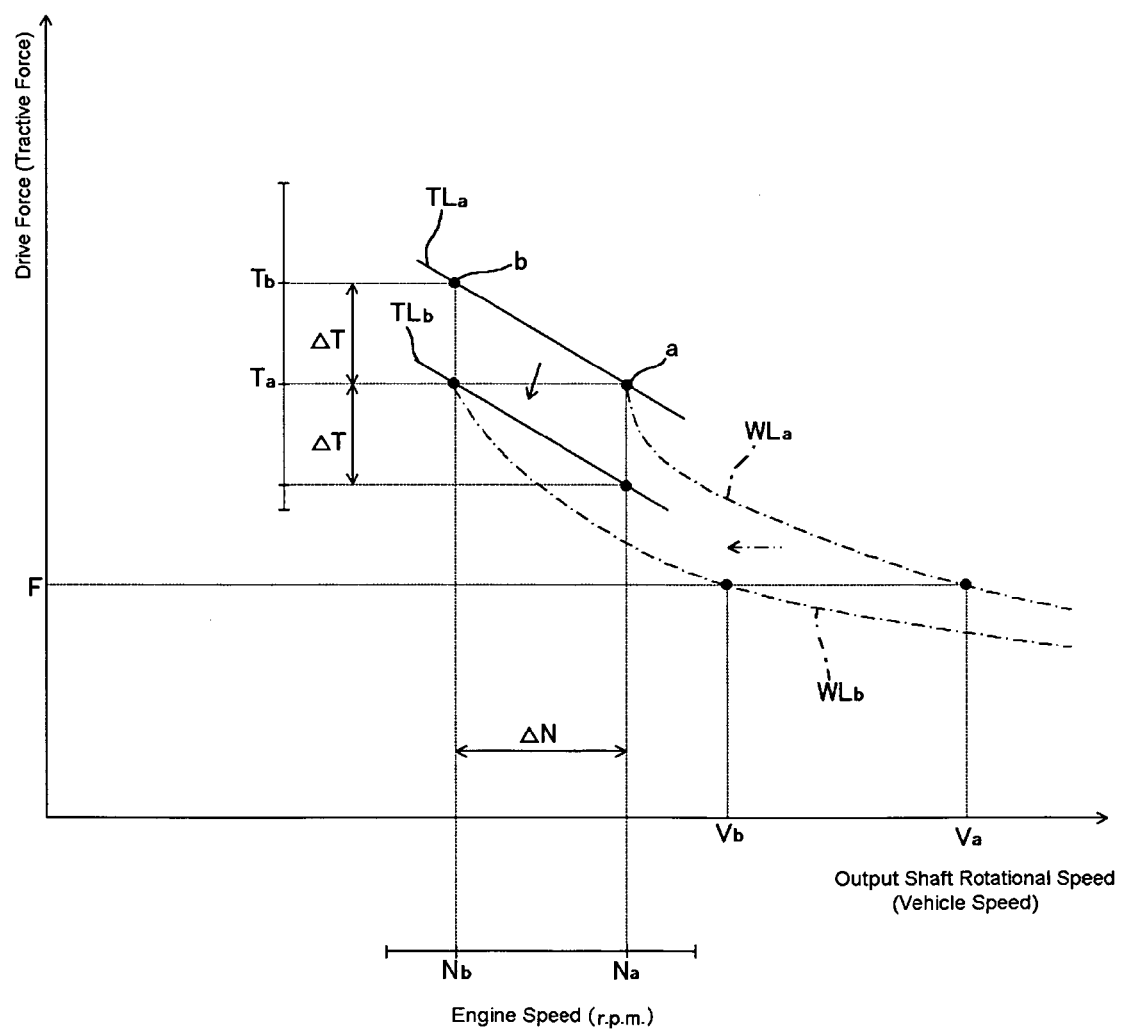
FIG. 6 is a graph (1) for explaining the fundamental principle of tractive force-vehicle speed characteristic control.

As shown in the tractive force-vehicle speed characteristic graph of FIG. 4, based on the tractive force and vehicle speed of the vehicle calculated from an input signal from the engine speed sensor 50, a vehicle speed region (Region (1)) is set which ranges from a vehicle speed corresponding to a maximum torque point $T_M$ of the engine 2 to a vehicle speed corresponding to a rated torque point $T_N$ (=an output torque point at which the output of the engine 2 is a rated power). Region (1) is the area (direct region) where the rotation of the second pump/motor 15 is stopped, that is, power transmission is carried out by the mechanical unit alone. If it is detected from input signals from the engine speed sensor 50 and the transmission output shaft speed sensor 51 that the vehicle speed has been shifted from Region (1) to the speed increasing side, in other words, the vehicle speed has entered a vehicle speed region (Region (2)) exceeding the vehicle speed corresponding to the rated torque point $T_N$, the first pump/motor 7 is then coupled to the second gear 5 (the input shaft 3 side) so that the transmission 1 functions as an output-split type transmission. On the other hand, if it is detected from input signals from the engine speed sensor 50 and the transmission output shaft speed sensor 51 that the vehicle speed has been shifted from Region (1) to the speed decreasing side, that is, the vehicle speed has entered a vehicle speed region (Region (3)) lower than the vehicle speed corresponding to the maximum torque point $T_M$, the first pump/motor 7 is then coupled to the fifth gear 17 (the intermediate output shaft 8 side), so that the transmission 1 functions as an input-split type transmission. It should be noted that, in the following description, the region where the transmission 1 functions as an output-split type transmission is called "an output-split region", whereas the region where the transmission 1 functions as an input-split type transmission is called "an input-split region". The tractive force-vehicle speed characteristic graph of FIG. 4 is a characteristic graph showing a condition where the decelerator 60 is not operated. The turning points for Regions (1), (2) and (3), which are specified by the maximum torque point $T_M$ and the rated torque point $T_N$, are shifted as described later during operation of the decelerator 60.

[The Process Performed by the Controller 40 During Deceleration of the Vehicle (See FIG. 5)]

Step S1: A check is made to determine whether a deceleration signal (decelerator pedal operating amount signal) has been input from the decelerator pedal operating amount sensor 62 provided for the decelerator 60, and the operating amount of the decelerator pedal is detected (S1). If a deceleration signal has been input, the program proceeds to Step S2.

Steps S2 to S5: At Step S2, it is determined which operating region the transmission 1 was placed in when the deceleration signal was input. This determination associated with the operating region is constantly made, irrespective of the presence/absence of a deceleration signal. The transmission 1 is operated in the input-split region (=Region (3) in FIG. 4) just after the operation of the vehicle has been started. The target speed ratio E which allows the volume ratio of the first pump/motor 7 to be zero is regarded as a reference speed ratio $e_c$, and if the actual speed ratio e has exceeded the reference speed ratio $e_c$, it is then determined that the operating region in which the transmission 1 is operated has been changed from the input-split region to the direct region (=Region (1) in FIG. 4). If it is determined that the transmission 1 was operated in the direct region when the deceleration signal was input, the target engine speed control map (B) shown in FIG. 3(*b*) is read in (S3). The target engine speed control map (B) provides an upper limit speed $N_H$ and a lower limit speed $N_Q$ for the operating amount of the decelerator pedal 61, i.e., the decelerator stroke when the transmission 1 is operated in the direct region. Specifically, if the actual speed n of the engine becomes lower than the lower limit speed $N_Q$ while the transmission 1 is operated in the direct region, the operating region of the transmission 1 will be changed to the input-split region. If the actual engine speed n becomes higher than the upper limit speed $N_H$, the operating region of the transmission 1 will be changed to the output-split region (=region (2) in FIG. 4). If the actual speed ratio e becomes lower than the reference speed ratio $e_c$ when the transmission 1 works in the output-split region, the operating region will be changed to the direct region. If it is determined that a deceleration signal has been input and the transmission 1 is working in the input-split region, the target engine speed control map (C) shown in FIG. 3(*c*) is then read in (S4). If it is determined that a deceleration signal has been input and the transmission 1 is working in the output-split region, the target engine speed control map (A) shown in FIG. 3(*a*) is then read in (S5).

Steps S6 to S7: If the transmission 1 is operated in the direct region, a drive signal is output to the fuel injection system 2*a* to reduce the output of the engine according to the operating amount of the decelerator pedal 61 (S6). If the transmission 1 is operated in the input-split or output-split region, the target engine speed N is changed based on the target engine speed control map which has been read in at Step S4 or S5. Concurrently with the change of the target engine speed N, a drive signal is input to the fuel injection system 2*a*, for reducing the output torque of the engine while keeping the ratio ($\Delta T/\Delta N$) of the amount of change $\Delta T$ in the output torque of the engine to the amount of change $\Delta N$ in the target engine speed substantially constant (Step S7). It is also possible to execute Step S7 and onward after Step S3, in the light of the consistency of the control performed in all of the operating regions of the transmission 1. In this case, the target engine speed is as indicated by broken lines in the target engine speed control maps (A), (B). The part indicated by each broken line varies so as to move to the right and left on the graph according to the load imposed on the transmission 1.

Steps S8 to S10: The target speed ratio E is calculated, by substituting the actual speed ratio e of the transmission 1, the actual engine speed n and the target engine speed N in the foregoing equation (1) [$E=e+k(n-N)$] (S8). An angle control signal for reducing the difference between the calculated target speed ratio E and the actual speed ratio e is output to the servo mechanisms 42, 43 until the actual speed ratio e becomes equal to the target speed ratio E (S9 to S10). To sum up, when the hydrostatic transmission unit of the HMT is working, the decelerator is controlled such that the amount of fuel injection is reduced by operation of the decelerator pedal and at the same time, the target engine speed for the HMT is decreased.

[The Fundamental Principle of the Tractive Force-Vehicle Speed Characteristic Control (See FIGS. 6 to 9)]

In the controller 40, after one target value $N_a$ for the actual engine speed of the engine 2 has been set, the CPU calculates a target value for the speed ratio of the transmission 1 based on the foregoing equation (1) such that the actual engine speed of the engine 2 becomes coincident with the target value $N_a$. Then, the calculated target value for the speed ratio is set as the target speed ratio and the controller 40 outputs an angle control signal to the servo mechanisms 42, 43 to make the actual speed ratio of the transmission 1 coincident with the target speed ratio. Subsequently, the transmission 1 performs gear shifting (torque conversion) such that an engine output torque value corresponding to the target value $N_a$ is set as an input torque value and the transmission 1 generates, from its intermediate output shaft 8, output torque which matches the tractive force F required by the load, while the input torque value is kept constant. Then, a tractive force-vehicle speed characteristic line $WL_a$ is set based on the gear shifting operation described above (see FIG. 6). Similarly, when the target engine speed is changed from one target value $N_a$ to another target value $N_b$ that is lower than the target value $N_a$ through operation of the decelerator 60, the transmission 1 performs gear shifting (torque conversion) such that an engine output torque value corresponding to the target value $N_b$ is set as an input torque value and the transmission 1 generates, from its intermediate output shaft 8, output torque which matches the tractive force F required by the load, while keeping the input torque value constant. Then, a tractive force-vehicle speed characteristic line $WL_b$ is set based on the gear shifting operation described above (see FIG. 6).

When the target engine speed is changed from the target value $N_a$ to the lower target value $N_b$, the controller 40 outputs a drive signal to the fuel injection system 2a to reduce the output torque of the engine, while keeping the ratio $\Delta T/\Delta N$ constant or substantially constant. The ratio $\Delta T/\Delta N$ is the ratio of the amount of change $\Delta T$ (Ta−Tb) in the engine output torque value to the amount of change $\Delta N$ (=Na−Nb) in the target engine speed N, that is, the average change rate (the inclination indicated by line a-b) of engine output torque in the transition region (between $N_a$ and $N_b$) of the target engine speed N. Accordingly, the engine output torque characteristic varies from the engine output torque characteristic line (only the essential part is shown) indicated by $TL_a$ in FIG. 6 to the engine output torque characteristic line (only the essential part is shown) indicated by $TL_b$ in FIG. 6. As a result, the tractive force-vehicle speed characteristic is also shifted to the tractive force-vehicle speed characteristic line $WL_b$ which is plotted in a lower vehicle speed region of the tractive force-vehicle speed characteristic graph of FIG. 6 than the tractive force-vehicle speed characteristic line $WL_a$ is. Then, the vehicle speed, which is determined by determining the tractive force F required by the load, is reduced ($V_a \rightarrow V_b$).

Figure 7:
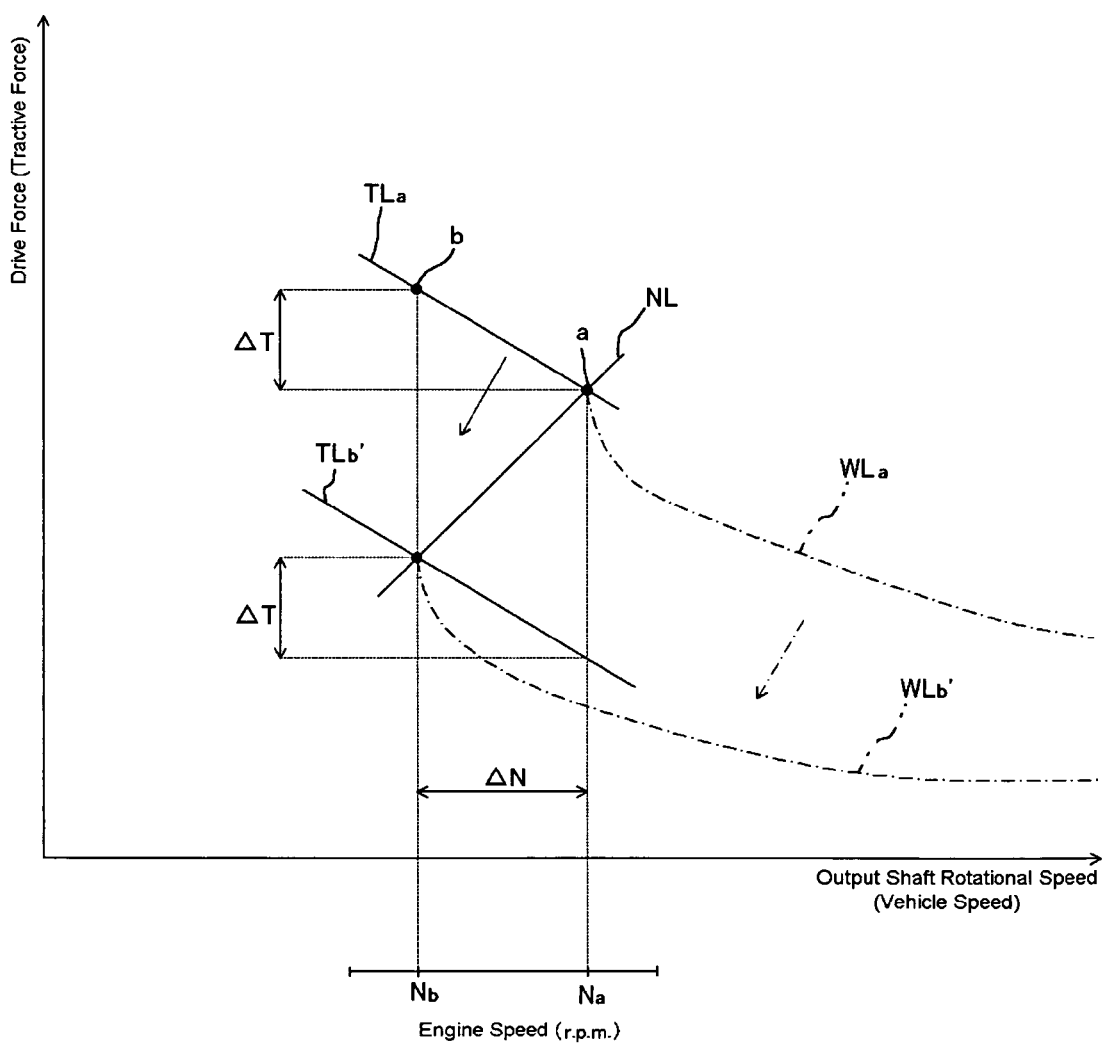
FIG. 7 is a graph (2) for explaining the fundamental principle of tractive force-vehicle speed characteristic control.

By setting a target engine speed transition characteristic line (only the essential part is shown) such as indicated by NL in FIG. 7, in other words, by controlling the amount of reduction in engine output torque with respect to the amount of change in target engine speed in the above-described engine control, another tractive force-vehicle speed characteristic line $WL_b'$ is set in a region which is lower than the tractive force-vehicle speed characteristic line $WL_a$ in terms of tractive force and vehicle speed in the tractive force-vehicle speed characteristic graph of FIG. 7.

Figure 8:
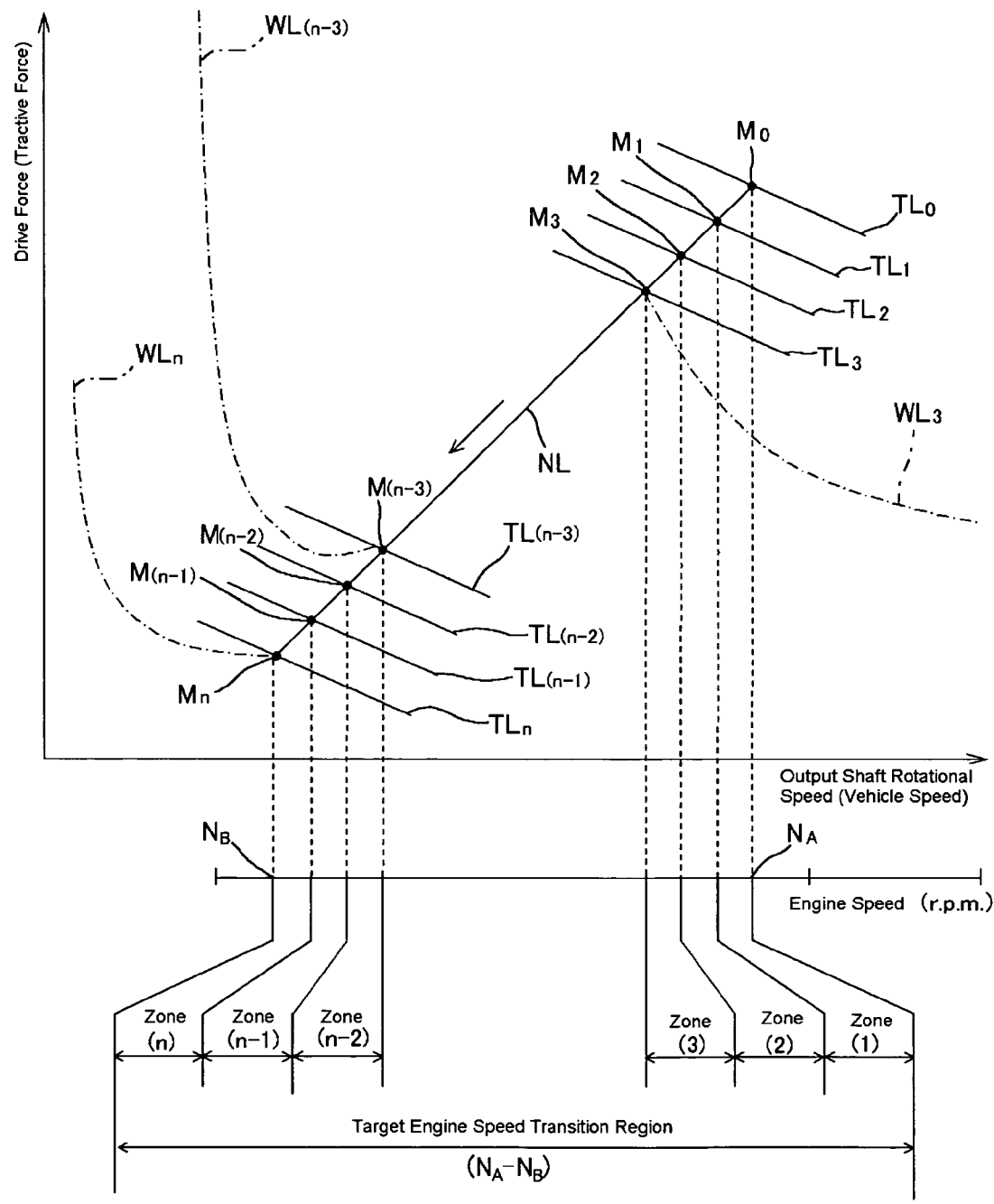
FIG. 8 is a graph (3) for explaining the fundamental principle of tractive force-vehicle speed characteristic control.

Thereafter, the tractive force-vehicle speed characteristic control illustrated in FIG. 7 is carried out ($TL_0 \rightarrow TL_1$, $TL_1 \rightarrow TL_2$, $TL_2 \rightarrow TL_3$, . . . $TL_{(n-3)} \rightarrow TL_{(n-2)}$, $TL_{(n-2)} \rightarrow TL_{(n-1)}$, $TL_{(n-1)} \rightarrow TL_n$,), as shown in FIG. 8, in each of n zones into which the target engine speed transition region ($N_A$-$N_B$) is divided, and the number of zones n is increased to the maximum. As a result, the point (hereinafter referred to as "matching point") specified by the engine output torque value corresponding to the engine speed value when the actual engine speed of the engine 2 is coincident with the present target engine speed is shifted on a target engine speed transition characteristic line NL which is set based on the target engine speed control map ($M_0 \rightarrow M_1 \rightarrow M_2 \rightarrow M_3 \ldots M_{(n-3)} \rightarrow M_{(n-2)} \rightarrow M_{(n-1)} \rightarrow M_n$). Thus, a tractive force-vehicle speed characteristic can be respectively set for the low load/high speed region, low load/low speed region and high load/low speed region of the tractive force-vehicle speed characteristic graph of FIG. 8, by controlling setting of the target engine speed transition characteristic line NL, in other words, by controlling setting of a target engine speed control map (see the tractive force-vehicle speed characteristic lines indicated by $WL_3$, $WL_n$ and $WL_{(n-3)}$).

Figure 9:
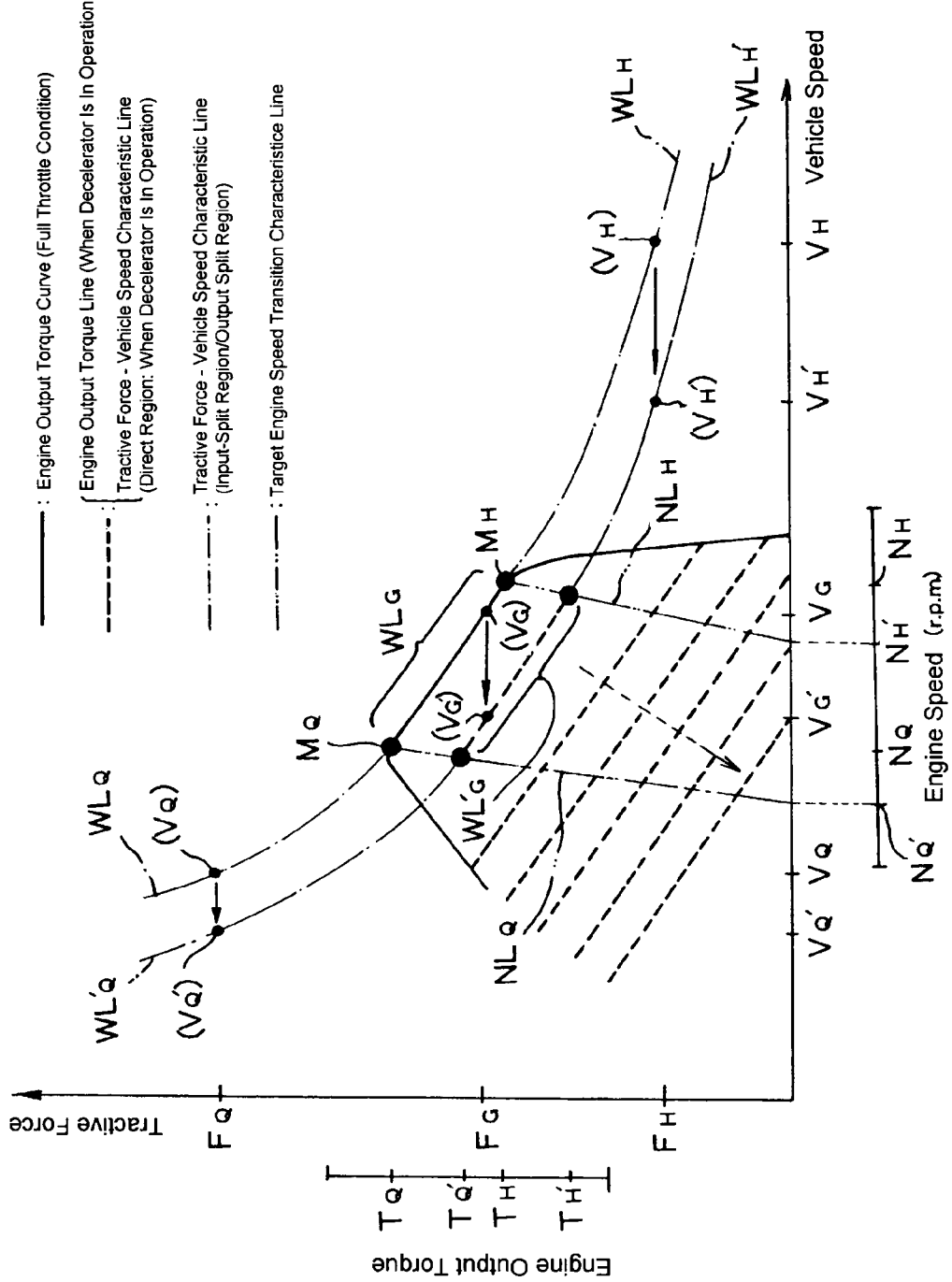
FIG. 9 is a graph (4) for explaining the fundamental principle of tractive force-vehicle speed characteristic control.

If the decelerator 60 is operated in a condition where the tractive force-vehicle speed characteristic shown in FIG. 9 is set, the following control will be performed by the engine control system 65 in response to a deceleration signal (deceleration command) output from the decelerator 60. The lines designated by $NL_Q$ and $NL_H$ in FIG. 9 are transition characteristic lines for the target engine speeds set based on the target engine speed control maps shown in FIGS. 3(a) to 3(b).

Specifically, in the tractive force-vehicle speed characteristic control shown in FIG. 9, the swash plate angle control of the servo mechanisms 42, 43 and the switch-over control of the switching valve 44 described earlier are performed through the controller 40, so that gear shifting is performed such that while an engine output torque value $T_Q$ corresponding to the engine speed $N_Q$ in the lower speed region of the engine 2 being kept constant as an input torque value, the transmission 1 generates, from the intermediate output shaft 8, output torque matching the tractive force required by the load, and the tractive force-vehicle speed characteristic line $WL_Q$ in the lower speed region is set based on this gear shifting operation. Also, gear shifting is performed such that while an engine output torque value $T_H$ corresponding to the engine speed $N_H$ in the higher speed region of the engine 2 being kept constant as an input torque value, the transmission 1 generates, from the intermediate output shaft 8, output torque matching the tractive force required by the load, and a tractive force-vehicle speed characteristic line $WL_H$ in the higher speed region is set based on this gear shifting operation. In addition, the direct region is formed which is an engine speed region situated between the engine speed $N_Q$ in the lower speed region and the engine speed $N_H$ in the higher speed region and in which power transmission from the input shaft 3 to the intermediate output shaft 8 is carried out by the mechanical transmission unit only in the transmission 1. And, a tractive force-vehicle speed characteristic line $WL_G$ corresponding to the direct region is set.

If deceleration is carried out by the decelerator 60 in the condition where the tractive force-vehicle speed characteristic shown in FIG. 9 is set, the engine control system 65 will operate, in response to a deceleration signal from the decelerator 60, to reduce engine output torque corresponding to the engine speed region including the engine speed $N_Q$ in the lower speed region and the engine speed $N_H$ in the higher speed region (see the engine output torque line indicated by broken line in FIG. 9). Therefore, the tractive force-vehicle speed characteristic line $WL_Q$ in the lower speed region, the tractive force-vehicle speed characteristic line $WL_G$ corresponding to the direct region, and the tractive force-vehicle speed characteristic line $WL_H$ in the higher speed region are respectively shifted to a lower tractive force region in the tractive force-vehicle speed characteristic graph of FIG. 9 [$(WL_Q; WL_G; WL_H) \rightarrow (WL_Q'; WL_G'; WL_H')$], and the vehicle speed determined by determination of the tractive force required by the load is rapidly reduced in all vehicle speed regions [$(V_Q \rightarrow V_Q'); (V_G \rightarrow V_G'); (V_H \rightarrow V_H')$].

Figure 10:
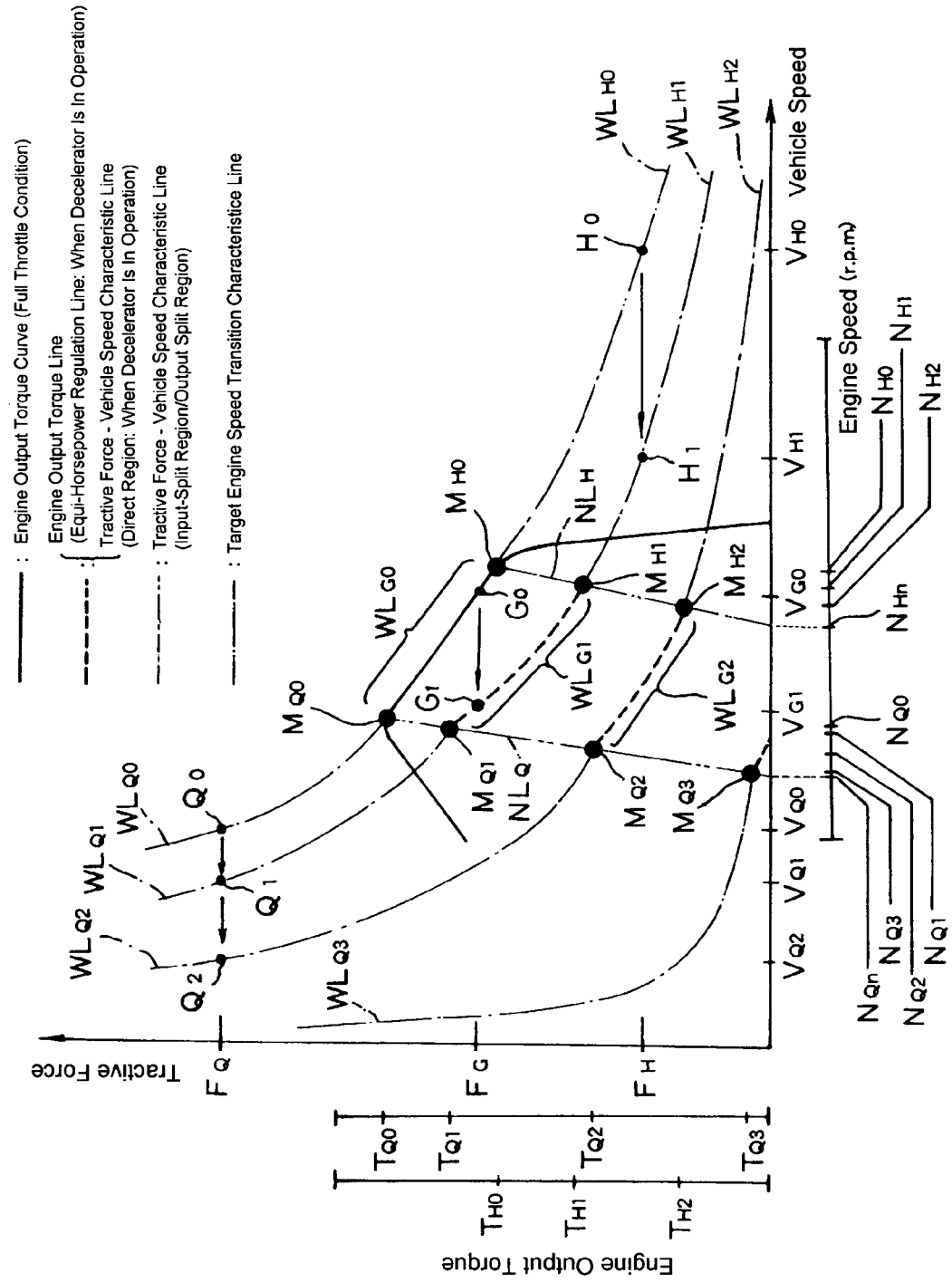
FIG. 10 is a tractive force-vehicle speed characteristic graph for explaining deceleration carried out by the vehicle control system of the embodiment.

In this embodiment, when the decelerator 60 is in operation, the injection characteristic of the fuel injection system 2a is set as shown in FIG. 10 such that an engine output torque characteristic corresponding to the engine speed region between an engine speed ($N_{Q1}, N_{Q2}, N_{Q3} \ldots N_{Qn}$) in a lower speed region and an engine speed ($N_{H1}, N_{H2} \ldots N_{Hn}$) in a higher speed region becomes such an engine output torque characteristic that allows constant or substantially constant transition of engine horsepower, that is, an engine output torque characteristic which satisfies equi-horsepower regulation (see the engine output torque line indicated by broken line in FIG. 10). In this way, the excessive output of the engine is reduced to save fuel cost.

Note that a point specified by an engine speed in a lower speed region associated with setting of a tractive force-vehicle speed characteristic line in the lower speed region and an engine output torque value corresponding to this engine speed in the lower speed region is hereinafter referred to as "a matching point in the lower speed region", whereas a point specified by an engine speed in a higher speed region associated with setting of a tractive force-vehicle speed characteristic line in the higher speed region and an engine output torque value corresponding to this engine speed in the higher speed region is hereinafter referred to as "a matching point in the higher speed region".

With reference to the tractive force-vehicle speed characteristic graph of FIG. 10, the operation of the vehicle control system of this embodiment during deceleration will be explained based on the fundamental principle of the tractive force-vehicle speed characteristic control described earlier.

In the tractive force-vehicle speed characteristic graph shown in FIG. 10, the swash plate angle control of the servo mechanisms 42, 43 and the switch-over control of the switching valve 44 described earlier are performed, so that gear shifting is done such that while an engine output torque value $T_{Q0}$ corresponding to an engine speed $N_{Q0}$ in a lower speed region of the engine 2 being kept constant as an input torque value, the transmission 1 generates, from the intermediate output shaft 8, output torque matching the tractive force required by the load, and a tractive force-vehicle speed characteristic line $WL_{Q0}$ in the lower speed region based on this gear shifting operation is set as the input-split region. Also, gear shifting is done such that while an engine output torque value $T_{H0}$ corresponding to an engine speed $N_{H0}$ in a higher speed region of the engine 2 being kept constant as an input torque value, the transmission 1 generates, from the intermediate output shaft 8, output torque matching the tractive force required by the load, and a tractive force-vehicle speed characteristic line $WL_{H0}$ in the higher speed region based on this gear shifting operation is set as the output-split region. In addition, the direct region is formed which is an engine speed region situated between the engine speed $N_{Q0}$ in the lower speed region and the engine speed $N_{H0}$ in the higher speed region and in which power transmission from the input shaft 3 to the intermediate output shaft 8 is carried out by the mechanical transmission unit only in the transmission 1. And, a tractive force-vehicle speed characteristic line $WL_{G0}$ corresponding to the direct region is set. Further, the target engine speed transition characteristic lines indicated by $NL_Q$ and $NL_H$ in FIG. 10 are set according to the target engine speed control maps of FIGS. 3(a) to 3(c).

Where the tractive force-vehicle speed characteristic is thus set, if the decelerator pedal 61 of the decelerator 60 is pressed until the operating amount of the pedal reaches, for example, about 60% of the entire stroke, one matching point in the lower speed region is shifted from a point $M_{Q0}$ to a point $M_{Q2}$ through a point $M_{Q1}$ on the target engine speed transition characteristic line $NL_Q$, whereas one matching point in the higher speed region is shifted from a point $M_{H0}$ to a point $M_{H2}$ through a point $M_{H1}$ on the target engine speed transition characteristic line $NL_H$. As a result, the tractive force-vehicle speed characteristic line $WL_{Q0}$ in the lower speed region which is set by the matching point $M_{Q0}$ in the lower speed region as the input-split region is shifted to a tractive force-vehicle speed characteristic line $WL_{Q2}$ which is set by the matching point $M_{Q2}$ as the input-split region by way of a tractive force-vehicle characteristic line indicated by $WL_{Q1}$. Similarly, the tractive force-vehicle speed characteristic line $WL_{H0}$ in the higher speed region which is set by the matching point $M_{H0}$ in the higher speed region as the output-split region is shifted to a tractive force-vehicle speed characteristic line $WL_{H2}$ which is set by the matching point $M_{H2}$ as the output-split region by way of a tractive force-vehicle characteristic line indicated by $WL_{H1}$. At the same time, the tractive force-vehicle speed characteristic line $WL_{G0}$ which corresponds to the direct region between the matching point $MO_{Q0}$ in the lower speed region and the matching point $M_{H0}$ in the higher speed region is shifted to a tractive force-vehicle speed characteristic line $WL_{G2}$ by way of a tractive force-vehicle speed characteristic line indicated by $WL_{G1}$.

Where the balancing point between a tractive force $F_Q$ required by a load and the tractive force-vehicle speed characteristic lies on the tractive force-vehicle speed characteristic line of the input-split region, the balancing point is shifted to the lower speed side by the decelerating operation described earlier ($Q_0 \rightarrow Q_1 \rightarrow Q_2$) and vehicle speed is reduced from $V_{Q0}$ to $V_{Q2}$ through $V_{Q1}$. Where the balancing point between a tractive force $F_G$ required by a load and the tractive force-vehicle speed characteristic lies on the tractive force-vehicle speed characteristic line of the direct region, the balancing point is shifted to the lower speed side by the above-described decelerating operation ($G_0 \rightarrow G_1$) and vehicle speed is reduced from $V_{G0}$ to $VG_1$. Where the balancing point between a tractive force $F_H$ required by a load and the tractive force-vehicle speed characteristic lies on the tractive force-vehicle speed characteristic line of the output-split region, the balancing point is shifted to the lower speed side by the above-described decelerating operation ($H_0 \rightarrow H_1$) and vehicle speed is reduced from $V_{H0}$ to $V_{H1}$.

Figure 11:
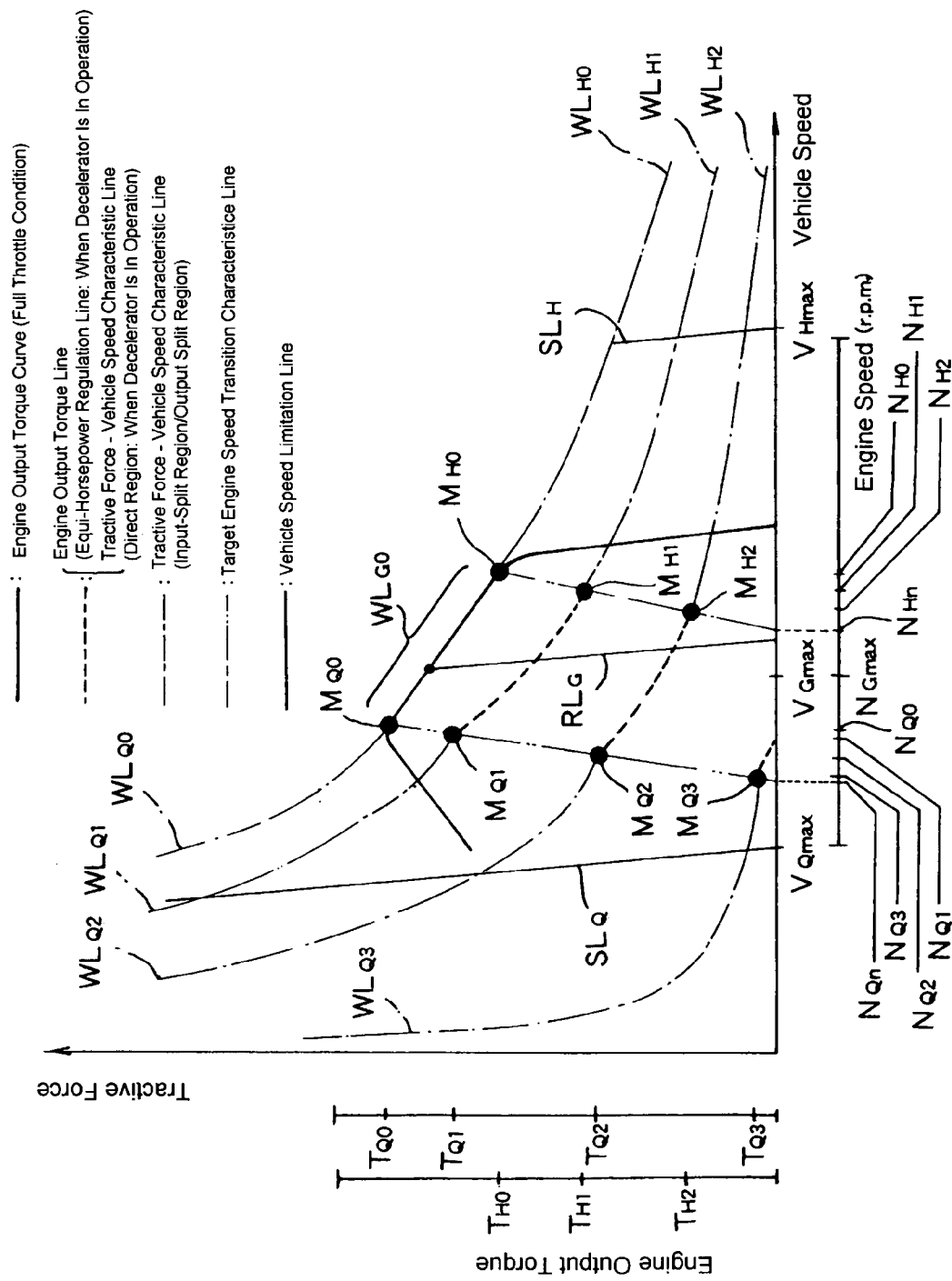
FIG. 11 is a tractive force-vehicle speed characteristic graph illustrating a state where a maximum speed is set by maximum speed setting means.

If the maximum speed setting lever 56 is operated to set the maximum speed to, for example, a vehicle speed $V_{Gmax}$ (see FIG. 11) in the vehicle speed region corresponding to the direct region, the engine control system 65 then sets a regulation line indicated by $RL_G$ in FIG. 11 in a high engine speed region which includes an engine speed $N_{Gmax}$ matching the maximum speed $V_{Gmax}$, so that the maximum speed of the vehicle is limited to $V_{Gmax}$. If the maximum speed setting lever 56 is operated to set the maximum speed to, for example, a vehicle speed $V_{Qmax}$ (see FIG. 11) in the vehicle speed region corresponding to the input-split region or to a vehicle speed $V_{Hmax}$ (see FIG. 11) in the vehicle speed region corresponding to the output-split region, the speed ratio will be limited by the swash plate angle control of the servo mechanisms 42, 43. As a result, a vehicle speed limitation line indicated by $SL_Q$ or $SL_H$ in FIG. 11 is set, so that the maximum speed of the vehicle is limited to $V_{Qmax}$ or $V_{Hmax}$.

As described earlier, it is possible for this embodiment to perform quick deceleration in conjunction with the operation of the decelerator 60 in all vehicle speed regions and to set a vehicle region (direct region) where power from the engine 2 is transmitted through the mechanical transmission unit only in the transmission 1. In addition, this embodiment has the advantage that since a maximum speed can be arbitrarily set by the maximum speed setting lever 56 in all vehicle speed regions, the speed of the vehicle can be regulated so as not to exceed the set maximum speed even if the work load suddenly drops.

Further, since the vehicle control system of this embodiment is equipped with the transmission 1 capable of allowing hydraulic power to flow in a forward direction at all times, increases in the loss of horsepower caused by a power flow in a reverse direction are not seen unlike the prior art input-split type and output-split type transmissions, so that improved power efficiency can be ensured. In addition, torque shortages can be prevented, resulting in improved operability.

What is claimed is:

1. A vehicle control system, comprising:
    an engine;
    a hydro-mechanical transmission constructed such that power from the engine is transmitted from an input shaft to an output shaft through a mechanical transmission unit and a hydrostatic transmission unit;
    engine controlling means for controlling the engine; and
    decelerating means for outputting a deceleration command in accordance with an amount by which the decelerating means is operated;
    wherein, in a lower speed region of the engine, a first torgue transforming is carried out such that the hydro-mechanical transmission generates, from the output shaft, a first output torque which matches a first tractive force required by a given load, while setting a first engine output torque value corresponding to a first engine speed in the lower speed region as a first input torque value and keeping said first input torque value constant, and a first tractive force-vehicle speed characteristic in the lower speed region is set based on said first torgue transforming in the lower speed region,
    wherein, in a higher speed region of the engine, a second torgue transforming is carried out such that the hydro-mechanical transmission generates, from the output shaft, a second output torque which matches a second tractive force required by the given load, while setting a second engine output torque value corresponding to a second engine speed in the higher speed region as a second input torque value and keeping said second input torque value constant, and a second tractive force-vehicle speed characteristic in the higher speed region is set based on said second torgue transforming in the higher speed region, and
    wherein a third tractive force-vehicle speed characteristic corresponding to a direct region is set, and the direct region is an engine speed region between said first engine speed in the lower speed region and said second engine speed in the higher speed region, in which power from the input shaft is transmitted to the output shaft through the mechanical transmission unit alone, and
    wherein the engine controlling means controls the engine so as to reduce, in response to the deceleration command from the decelerating means, the engine output torque which corresponds to an engine speed region between said first engine speed in the lower speed region and said second engine speed in the higher speed region including said first and second engine speed.

2. The vehicle control system according to claim 1, wherein said engine controlling means controls the engine such that, when the decelerating means is in operation, an engine output torque characteristic corresponding to the engine speed region between the first engine speed in the lower speed region and the second engine speed in the higher speed region reaches a value that allows constant or substantially constant transition of engine horsepower.

3. The vehicle control system according to claim 1,
    wherein said mechanical transmission unit is a planetary gear train interposed between the input shaft and the output shaft,
    wherein said hydrostatic transmission unit has a first pump/motor and a second pump/motor connected to the first pump/motor,
    wherein said input shaft is coupled to a first element of the planetary gear train, said second pump/motor is coupled to a second element of the planetary gear train and said output shaft is coupled to a third element of the planetary gear train, and
    wherein a clutch mechanism is provided which is engaged or disengaged so as to selectively couple said first pump/motor to either the input or output shaft.

4. The vehicle control system according to claim 3,
    wherein said engine controlling means controls the engine such that, when the decelerating means is in operation, an engine output torque characteristic corresponding to the engine speed region between the first engine speed in the lower speed region and the second engine speed in the higher speed region reaches a value that allows constant or substantially constant transition of engine horsepower.

5. The vehicle control system according to claim 1, further comprising maximum speed setting means for setting a maximum vehicle speed, wherein when the maximum vehicle speed set by the maximum speed setting means is in the range of a vehicle speed region corresponding to said direct region, the engine controlling means controls the engine such that the speed of the engine matches the set maximum vehicle speed.

6. The vehicle control system according to claim 2, further comprising maximum speed setting means for setting a maximum vehicle speed, wherein when the maximum vehicle speed set by the maximum speed setting means is in the range of a vehicle speed region corresponding to said direct region, the engine controlling means controls the engine such that the speed of the engine matches the set maximum vehicle speed.

7. The vehicle control system according to claim 3, further comprising maximum speed setting means for setting a maximum vehicle speed, wherein when the maximum vehicle speed set by the maximum speed setting means is in the range of a vehicle speed region corresponding to said direct region, the engine controlling means controls the engine such that the speed of the engine matches the set maximum vehicle speed.

8. The vehicle control system according to claim 4, further comprising maximum speed setting means for setting a maximum vehicle speed, wherein when the maximum vehicle speed set by the maximum speed setting means is in the range of a vehicle speed region corresponding to said direct region, the engine controlling means controls the engine such that the speed of the engine matches the set maximum vehicle speed.

* * * * *